US 12,355,360 B2

(12) United States Patent
Huang et al.

(10) Patent No.: US 12,355,360 B2
(45) Date of Patent: Jul. 8, 2025

(54) ALTERNATING CURRENT POWER SUPPLY CIRCUIT, CONTROL METHOD THEREOF, AND ALTERNATING CURRENT POWER SUPPLY WITH AN EFFICIENT SOFT SWITCHING CIRCUIT

(71) Applicant: Huawei Digital Power Technologies Co., Ltd., Shenzhen (CN)

(72) Inventors: Zhuyong Huang, Dongguan (CN); Xiaofei Zhang, Dongguan (CN); Chuntao Zhang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 225 days.

(21) Appl. No.: 17/976,579

(22) Filed: Oct. 28, 2022

(65) Prior Publication Data

US 2023/0053066 A1     Feb. 16, 2023

Related U.S. Application Data

(63) Continuation of application No. PCT/CN2021/074897, filed on Feb. 2, 2021.

(30) Foreign Application Priority Data

Apr. 30, 2020   (CN) .......................... 202010367861.9

(51) Int. Cl.
    H02M 5/458      (2006.01)
    H02M 1/00       (2007.01)

(52) U.S. Cl.
    CPC ....... H02M 5/4585 (2013.01); H02M 1/0058 (2021.05)

(58) Field of Classification Search
    CPC .. H02M 5/4505; H02M 5/4585; H02M 5/451; H02M 5/452; H02M 5/453;
    (Continued)

(56) References Cited

U.S. PATENT DOCUMENTS

| 9,419,522 | B1 | 8/2016 | Khaligh et al. | |
|---|---|---|---|---|
| 10,536,094 | B2 * | 1/2020 | Zmood | H02M 7/487 |
| 2001/0045863 | A1 * | 11/2001 | Pelly | H02M 5/458 |
| | | | | 327/552 |
| 2008/0061628 | A1 * | 3/2008 | Nielsen | H02M 1/10 |
| | | | | 307/66 |

(Continued)

FOREIGN PATENT DOCUMENTS

| CN | 101316074 A | 12/2008 |
|---|---|---|
| CN | 101728961 A | 6/2010 |

(Continued)

OTHER PUBLICATIONS

Alemi et al., "DC-Link Capacitance Minimization in T-Type Three-Level AC/DC/AC PWM Converters," IEEE Transactions on Industrial Electronics, vol. 62, No. 3, XP055616074, USA ISSN: 0278-0046, DOI:10.1109/TIE.2014.2345354A, Total 10 pages, Institute of Electrical and Electronics Engineers, New York, New York (Mar. 1, 2015).

*Primary Examiner* — Gustavo A Rosario-Benitez
(74) *Attorney, Agent, or Firm* — Leydig, Voit & Mayer, Ltd.

(57) ABSTRACT

Embodiments of this application provide an alternating current power supply circuit, a control method for an alternating current power supply circuit. The alternating current power supply circuit includes a rectifier module and an inverter module. The rectifier module includes a first inductor, a first branch, a second branch, a third branch, a first capacitor, and a second capacitor, the third branch includes a soft switching cell, the soft switching cell includes a first switching component and a second switching component that are reversely connected in series, and the first branch, the second branch, and the third branch form an I-type three-level topology or a T-type three-level topology. The inverter module includes a second inductor, a fourth branch, a fifth branch, a sixth branch, the first capacitor, and the second capacitor, the sixth branch includes the soft switching cell, and the fourth branch, the fifth branch.

16 Claims, 16 Drawing Sheets

(58) Field of Classification Search
CPC ...... H02M 5/458; H02M 1/0058; H02M 1/12; H02M 1/123
See application file for complete search history.

(56) References Cited

U.S. PATENT DOCUMENTS

| | | | | |
|---|---|---|---|---|
| 2014/0334199 | A1* | 11/2014 | He | H02M 5/4585 363/37 |
| 2015/0381070 | A1* | 12/2015 | Bäckman et al. | H02M 5/4585 363/37 |
| 2017/0155313 | A1* | 6/2017 | Mao | H02M 1/4208 |
| 2017/0353126 | A1* | 12/2017 | Wang | H02M 1/10 |
| 2018/0006548 | A1 | 1/2018 | Santi | |
| 2020/0204081 | A1* | 6/2020 | Backman | H02M 3/158 |

FOREIGN PATENT DOCUMENTS

| | | | | |
|---|---|---|---|---|
| CN | 102624266 | A | 8/2012 | |
| CN | 104753140 | A | 7/2015 | |
| CN | 204578144 | U | 8/2015 | |
| CN | 105207510 | A | 12/2015 | |
| CN | 106663940 | A | 5/2017 | |
| CN | 206422588 | U | 8/2017 | |
| CN | 107204714 | A | 9/2017 | |
| CN | 108092535 | A | 5/2018 | |
| CN | 111509992 | A | 8/2020 | |
| JP | 2015122913 | A * | 7/2015 | ............ H02M 7/48 |
| JP | 2019140890 | A | 8/2019 | |
| WO | 2015098651 | A1 | 7/2015 | |
| WO | 2015199718 | A1 | 12/2015 | |
| WO | 2019046230 | A1 | 3/2019 | |

* cited by examiner

ALTERNATING CURRENT POWER SUPPLY CIRCUIT, CONTROL METHOD THEREOF, AND ALTERNATING CURRENT POWER SUPPLY WITH AN EFFICIENT SOFT SWITCHING CIRCUIT

CROSS-REFERENCE TO RELATED APPLICATIONS

This application is a continuation of International Application No. PCT/CN2021/074897, filed on Feb. 2, 2021, which claims priority to Chinese Patent Application No. 202010367861.9, filed on Apr. 30, 2020. The disclosures of the aforementioned applications are hereby incorporated by reference in their entireties.

TECHNICAL FIELD

Embodiments of this application relate to the electronic field, and in particular, to an alternating current power supply circuit, a control method for an alternating current power supply circuit, and an alternating current power supply.

BACKGROUND

In the alternating current power supply field, after a topology is upgraded from a two-level topology to a three-level topology, currently, a three-level circuit is used for most devices, and a multi-level circuit such as a five-level circuit is used for a small quantity of devices. Most of existing alternating current power supply circuits are hard switching circuits. A switching loss is large, and it is difficult to improve efficiency. Due to high circuit complexity and poor circuit stability, a resonant soft switching technology is usually used for a circuit whose input/output voltage is a direct current voltage, but is very difficult to be applied to an alternating current power supply. Consequently, it is more difficult to improve efficiency of an alternating current power supply device. Therefore, a more efficient soft switching circuit applied to an alternating current power supply is required.

SUMMARY

Embodiments of this application aims to provide a more effective alternating current power supply circuit, a control method thereof, and an alternating current power supply, to resolve a disadvantage in the conventional technology.

To achieve the foregoing objective, an aspect of this application provides an alternating current power supply circuit, including a rectifier module and an inverter module. The rectifier module includes a first inductor, a first branch, a second branch, a third branch, a first capacitor, and a second capacitor, a first end of the first inductor is connected to an input potential, a second end of the first inductor is connected to a common end of the first branch, the second branch, and the third branch, the other end of the first branch is connected to a first electrode of the first capacitor, the other end of the second branch is connected to a second electrode of the second capacitor, a second electrode of the first capacitor is connected to the first electrode of the first capacitor and is connected to a zero potential, the other end of the third branch includes a soft switching cell, the soft switching cell includes a first switching component and a second switching component that are reversely connected in series, a first end of the soft switching cell is connected to a common end of the first capacitor and the second capacitor, a second end of the soft switching cell is configured to be connected to the third branch, and the first branch, the second branch, and the third branch form an I-type three-level topology or a T-type three-level topology. The inverter module includes a second inductor, a fourth branch, a fifth branch, a sixth branch, the first capacitor, and the second capacitor, a first end of the second inductor is connected to an output potential, a second end of the second inductor is connected to a common end of the fourth branch, the fifth branch, and the sixth branch, the other end of the fourth branch is connected to the first electrode of the first capacitor, the other end of the fifth branch is connected to the second electrode of the second capacitor, the other end of the sixth branch includes the soft switching cell, the soft switching cell is connected to the sixth branch by using the second end of the soft switching cell, and the fourth branch, the fifth branch, and the sixth branch form an I-type three-level topology or a T-type three-level topology.

In the alternating current power supply circuit in this embodiment of this application, the circuit includes the soft switching cell. Compared with an alternating current power supply circuit with a three-level topology in the conventional technology, in this embodiment, a soft switching circuit may be realized by controlling the first switching component and the second switching component of the soft switching cell, to reduce a switching loss, and improve efficiency of the alternating current power supply circuit.

In an implementation, the first branch includes a third switching component, the second branch includes a fourth switching component, the third branch further includes a fifth switching component and a sixth switching component that are reversely connected in series, and the fifth switching component and the sixth switching component that are reversely connected in series are connected to the soft switching cell in series. In this implementation, a T-type three-level topology is included on a rectifier side, and includes fewer electronic components than an I-type three-level topology. Therefore, there is less energy consumption and smaller occupied space.

In an implementation, the first branch includes a third switching component and a sixth switching component that are connected in series in a same direction, the second branch includes a fourth switching component and a fifth switching component that are connected in series in a same direction, the third branch further includes a first sub-branch and a second sub-branch that are connected in parallel, the first sub-branch includes a fifth switching component and a first diode that are connected in series in a same direction, the second sub-branch includes a sixth switching component and a second diode that are connected in series in a same direction, and the first sub-branch and the second sub-branch that are connected in parallel are connected to the soft switching cell in series. In this implementation, an I-type three-level topology is included on a rectifier side, and a switching transistor in the I-type three-level topology withstands a low maximum voltage. Therefore, compared with a T-type three-level topology, in the I-type three-level topology, a switching transistor with low voltage withstanding performance can be used.

In an implementation, the fourth branch includes a seventh switching component, the fifth branch includes an eighth switching component, the sixth branch includes a ninth switching component and a tenth switching component that are reversely connected in series, and the ninth switching component and the tenth switching component that are reversely connected in series are connected to the soft switching cell in series. In this implementation, a T-type three-level topology is included on an inverter side, and includes fewer electronic components than an I-type three-level topology. Therefore, there is less energy consumption and smaller occupied space.

In an implementation, the fourth branch includes a seventh switching component and a ninth switching component that are connected in series in a same direction, the fifth branch includes an eighth switching component and a tenth switching component that are connected in series in a same direction, the third branch includes a third sub-branch and a fourth sub-branch that are connected in parallel, the third sub-branch includes a ninth switching component and a third diode that are connected in series in a same direction, the fourth sub-branch includes a tenth switching component and a fourth diode that are connected in series in a same direction, and the third sub-branch and the fourth sub-branch that are connected in parallel are connected to the soft switching cell in series. In this implementation, an I-type three-level topology is included on an inverter side, and a switching transistor in the I-type three-level topology withstands a low maximum voltage. Therefore, compared with a T-type three-level topology, in the I-type three-level topology, a switching transistor with low voltage withstanding performance can be used.

In an implementation, the rectifier module further includes a third capacitor, one end of the third capacitor is connected to the input potential, and the other end of the third capacitor is connected to the zero potential. In this implementation, a filter capacitor is connected to a rectifier side, so that a ripple current can be filtered out from an input alternating current, to prevent the ripple current from damaging the circuit.

In an implementation, the inverter module further includes a fourth capacitor, one end of the fourth capacitor is connected to the output potential, and the other end of the fourth capacitor is connected to the zero potential. In this implementation, a filter capacitor is connected to an inverter side, so that a ripple current can be filtered out from an output alternating current, to prevent the ripple current from damaging a load.

In an implementation, when the input potential and the output potential each are a positive potential, the third switching component and the fifth switching component are controlled to alternately emit a wave, the fourth switching component is controlled to be constantly turned off, the sixth switching component is controlled to be constantly turned on, the seventh switching component and the tenth switching component are controlled to alternately emit a wave, the eighth switching component is controlled to be constantly turned off, the ninth switching component is controlled to be constantly turned on, the fifth switching component is controlled to be turned off after the seventh switching component is turned on, the second switching component is controlled to be constantly turned on, the first switching component is controlled to be turned off in a time period from a first moment to a second moment and to be turned on in another time period, the first moment is a predetermined moment before the seventh switching component is turned on, and the second moment is a predetermined moment after the seventh switching component is turned on. In this implementation, the first switching component is turned off before the seventh switching component is turned on, so that zero voltage switching of the seventh switching component is performed, to reduce energy consumption of turning on the seventh switching component, and improve efficiency of the alternating current power supply circuit.

In an implementation, the second moment is a predetermined moment after the fifth switching component is turned off. In this implementation, the first switching component is turned on after the fifth switching component is turned off, so that the fifth switching component is turned off at zero voltage in a case of a low current, to reduce energy consumption of turning off the fifth switching component, and improve efficiency of the alternating current power supply circuit.

In an implementation, when the input potential and the output potential each are a negative potential, the fourth switching component and the sixth switching component are controlled to alternately emit a wave, the third switching component is controlled to be constantly turned off, the fifth switching component is controlled to be constantly turned on, the eighth switching component and the ninth switching component are controlled to alternately emit a wave, the seventh switching component is controlled to be constantly turned off, the tenth switching component is controlled to be constantly turned on, the sixth switching component is controlled to be turned off after the eighth switching component is turned on, the first switching component is controlled to be constantly turned on, the second switching component is controlled to be turned off in a time period from a third moment to a fourth moment and to be turned on in another time period, the third moment is a predetermined moment before the eighth switching component is turned on, and the fourth moment is a predetermined moment after the eighth switching component is turned on. In this implementation, the second switching component is turned off before the eighth switching component is turned on, so that zero voltage switching of the eighth switching component is performed, to reduce energy consumption of turning on the eighth switching component, and improve efficiency of the alternating current power supply circuit.

In an implementation, the fourth moment is a predetermined moment after the sixth switching component is turned off. In this implementation, the second switching component is turned on after the sixth switching component is turned off, so that the sixth switching component is turned off at zero voltage in a case of a low current, to reduce energy consumption of turning off the sixth switching component, and improve efficiency of the alternating current power supply circuit.

Another aspect of this application provides a control method for an alternating current power supply circuit. The circuit is any one of the foregoing power supply circuits. The method includes: monitoring an input potential and an output potential of the alternating current power supply circuit; and when the input potential and the output potential each are a positive potential, controlling a third switching component and a fifth switching component to alternately emit a wave, controlling a fourth switching component to be constantly turned off, controlling a sixth switching component to be constantly turned on, controlling a seventh switching component and a tenth switching component to alternately emit a wave, controlling an eighth switching component to be constantly turned off, controlling a ninth switching component to be constantly turned on, controlling the fifth switching component to be turned off after the seventh switching component is turned on, controlling a second switching component to be constantly turned on, and controlling a first switching component to be turned off in a time period from a first moment to a second moment and to be turned on in another time period, where the first moment is a predetermined moment before the seventh switching component is turned on, and the second moment is a predetermined moment after the seventh switching component is turned on.

In an implementation, the method further includes: when the input potential and the output potential each are a negative potential, controlling the fourth switching component and the sixth switching component to alternately emit a wave, controlling the third switching component to be constantly turned off, controlling the fifth switching component to be constantly turned on, controlling the eighth switching component and the ninth switching component to alternately emit a wave, controlling the seventh switching component to be constantly turned off, controlling the tenth switching component to be constantly turned on, controlling the sixth switching component to be turned off after the eighth switching component is turned on, controlling the first switching component to be constantly turned on, and controlling the second switching component to be turned off in a time period from a third moment to a fourth moment and to be turned on in another time period, where the third moment is a predetermined moment before the eighth switching component is turned on, and the fourth moment is a predetermined moment after the eighth switching component is turned on.

Another aspect of this application provides an alternating current power supply, including a controller and any one of the foregoing alternating current power supply circuits. The controller is connected to the alternating current power supply circuit, to perform any one of the foregoing methods.

DESCRIPTION OF DRAWINGS

Embodiments of this application are described with reference to accompanying drawings, so that embodiments of this application can be clearer.

DESCRIPTION OF EMBODIMENTS

The following describes technical solutions of embodiments in this application with reference to accompanying drawings. Embodiments of this application provide an alternating current power supply circuit and a control method thereof. The alternating current power supply circuit includes a soft switching cell including a switching component, so that a soft switching circuit is realized by controlling the soft switching cell. The alternating current power supply circuit in embodiment of this application may be used in an alternating current power supply such as a UPS or a converter. In the following description, a switching component is a component including a fully controlled switching transistor (referred to as a switching transistor below) and a diode that are reversely connected in parallel, the fully controlled switching transistor is, for example, an insulated gate bipolar transistor (IGBT) or a metal-oxide-semiconductor field-effect transistor (MOSFET). The diode is, for example, a parasitic diode included in the fully controlled switching transistor, or a diode connected to an outside of the fully controlled switching transistor in parallel. In the following, the switching component and the switching transistor and the diode included in the switching component are represented by using a same reference number. For example, a switching transistor in a switching component S1 is represented as a switching transistor S1, and a diode in the switching component S1 is represented as a diode S1. In addition, in descriptions in this application, turning on and turning off the switching component is turning on and turning off the switching transistor in the switching component.

Figure 1:
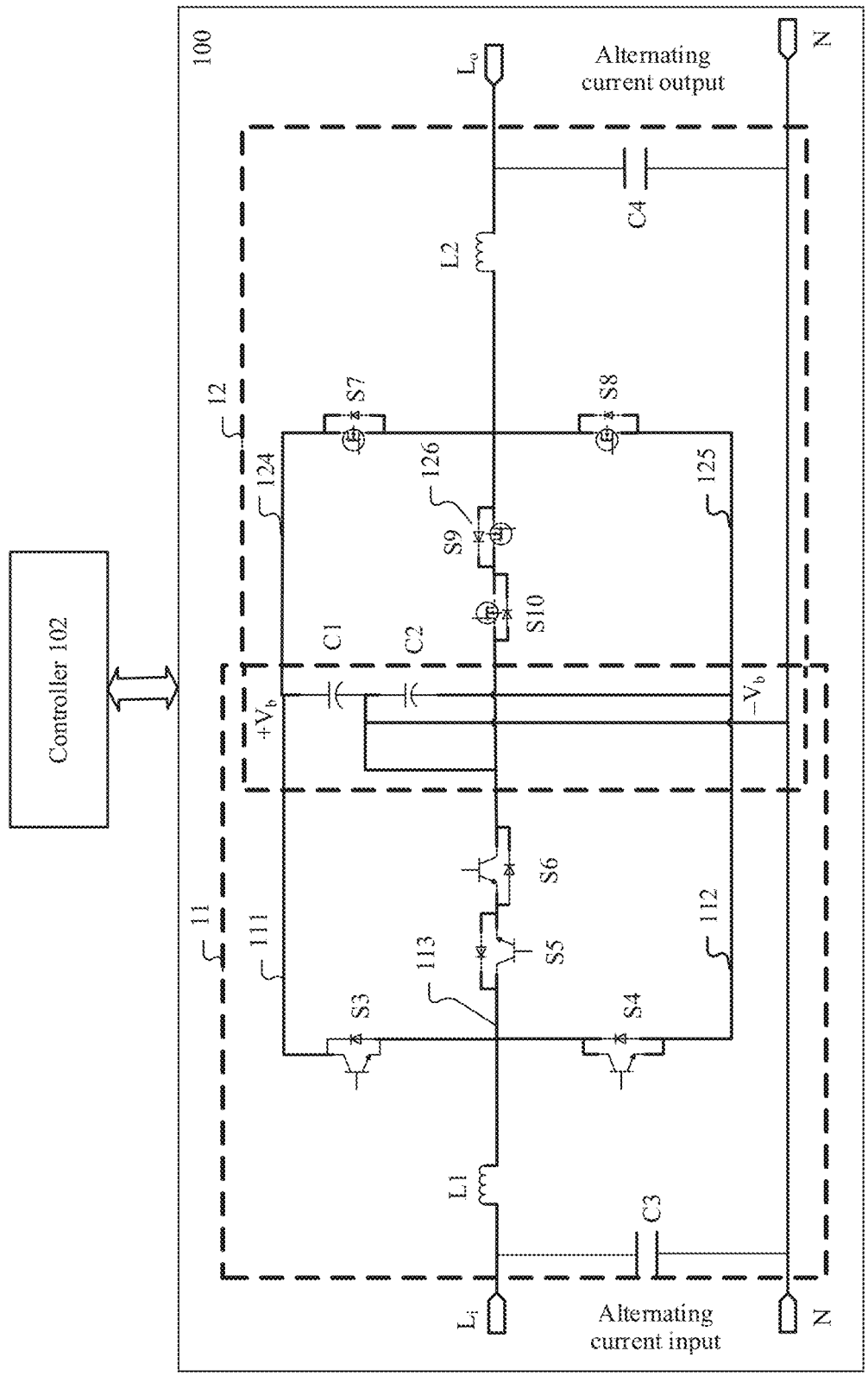
FIG. 1 is a schematic diagram of a structure of an alternating current power supply in the conventional technology.

FIG. 1 is a schematic diagram of a structure of an alternating current power supply in the conventional technology. As shown in FIG. 1, the alternating current power supply includes an alternating current power supply circuit 100 and a controller 102. The alternating current power supply circuit 100 includes a rectifier module 11 and an inverter module 12. The rectifier module 11 has a three-level rectifier topology structure. Specifically, as shown in FIG. 1, the rectifier module 11 includes an inductor L1, a capacitor C1, a capacitor C2, a capacitor C3, a branch 111, a branch 112, and a branch 113. A left end of the inductor L1 is connected to a live wire $L_i$ of an alternating current input, and a right end of the inductor L1 is connected to a common end of the branch 111, the branch 112, and the branch 113. The other end of the branch 111 is connected to a positive electrode of the capacitor C1, the other end of the branch 112 is connected to a negative electrode of the capacitor C2, and the other end of the branch 113 is connected to a common end of the capacitor C1 and the capacitor C2, and is connected to a zero wire (N wire) of the alternating current input. The capacitor C1 and the capacitor C2 are connected in series, and the capacitor C1 and the capacitor C2 are bus capacitors, and serve as energy storage capacitors in the alternating current power supply circuit 100. A positive electrode of the capacitor C1 has, for example, a bus potential of $+V_b$ volts, and a negative electrode of the capacitor C2 has, for example, a bus potential of $-V_b$ volts. Although the capacitor C1 and the capacitor C2 are shown as polar capacitors in FIG. 1, it can be understood that the capacitor C1 and the capacitor C2 are not limited to polar capacitors. The capacitor C3 is connected to the live wire and the zero wire of the alternating current input, and the capacitor C3 is a non-polar capacitor, and is configured to filter the alternating current input, to reduce a ripple current or a ripple voltage, thereby avoiding a damage risk of an electronic device.

As shown in FIG. 1, the branch 111 includes a switching component S3, the switching component S3 includes a switching transistor S3 and a diode S3, and the switching transistor S3 is, for example, an IGBT shown in FIG. 1, so that an emitter (E electrode) of the switching transistor S3 is connected to the inductor L1, and a collector (C electrode) of the switching transistor S3 is connected to the positive electrode of the capacitor C1. The branch 112 includes a switching component S4, the switching component S4 includes a switching transistor S4 and a diode S4, a collector of the switching transistor S4 is connected to the inductor L1, and an emitter of the switching transistor S4 is connected to the negative electrode of the capacitor C2. The branch 113 includes a switching component S5 and a switching component S6 that are reversely connected in series, the switching component S5 includes a switching transistor S5 and a diode S5, the switching component S6 includes a switching transistor S6 and a diode S6, a collector of the switching transistor S5 is connected to the inductor L1, an emitter of the switching transistor S5 is connected to an emitter of the switching transistor S6, a collector of the switching transistor S6 is connected to the common end of the capacitor C1 and the capacitor C2, the collector of the switching transistor S6 is further connected to the zero wire (N wire) of the alternating current input, and the zero wire is grounded. In other words, the zero wire is a wire whose voltage is 0 V.

The inverter module 12 has a three-level inverter topology structure. Specifically, as shown in FIG. 1, the inverter module 12 includes an inductor L2, the capacitor C1, the capacitor C2, a capacitor C4, a branch 124, a branch 125, and a branch 126. A right end of the inductor L2 is connected to a live wire $L_O$ of an alternating current output, and a left end of the inductor L2 is connected to a common end of the branch 124, the branch 125, and the branch 126. The other end of the branch 124 is connected to a positive electrode of the capacitor C1, the other end of the branch 125 is connected to a negative electrode of the capacitor C2, the other end of the branch 126 is connected to the common end of the capacitor C1 and the capacitor C2, and is connected to a zero wire of the alternating current output, and the zero wire of the alternating current input is connected to the zero wire of the alternating current output. The capacitor C4 is connected to the live wire ($L_O$ wire) and the zero wire (N wire) of the alternating current output, and is configured to filter the alternating current output, to reduce a ripple current, so that an output current is more stable.

As shown in FIG. 1, the branch 124 includes a switching component S7, the switching component S7 includes a switching transistor S7 and a diode S7, and the switching transistor S7 is, for example, a MOSFET transistor shown in FIG. 1, so that a drain (D electrode) of the switching transistor S7 is connected to the positive electrode of the capacitor C1, and a source (S electrode) of the switching transistor S7 is connected to the inductor L2. The branch 125 includes a switching component S8, the switching component S8 includes a switching transistor S8 and a diode S8, a drain of the switching transistor S8 is connected to the inductor L2, and a source of the switching transistor S8 is connected to the negative electrode of the capacitor C2. The branch 126 includes a switching component S9 and a switching component S10 that are reversely connected in series, a source of a switching transistor S9 in the switching component S9 is connected to the inductor L2, a drain of the switching transistor S9 is connected to a drain of a switching transistor S10 in the switching component S10, and a source of the switching transistor S10 is connected to the common end of the capacitor C1 and the capacitor C2, and is connected to a zero wire. In FIG. 1, the switching transistors S3 to S10 are not limited to the IGBT transistor or the MOSFET transistor shown in FIG. 1, but may be any fully controlled switching transistor. In addition, the switching transistors S3 to S10 may be a same switching transistor or different switching transistors.

The controller 102 is connected to the live wire of the alternating current input and the live wire of the alternating current output, and is configured to monitor whether the live wire voltage of the alternating current input and the live wire voltage of the alternating current output are positive voltages or negative voltages. The controller 102 is further connected to each of the switching transistors S3 to S10 in the circuit 100, to control turning on or turning off of each of the switching transistors based on a monitored voltage value. Specifically, for example, if the switching transistor S3 is an IGBT transistor, the controller 102 is connected to a gate of the switching transistor S3, to perform switching control on the switching transistor S3; for example, if the switching transistor S7 is a MOSFET transistor, the controller 102 is connected to a gate of the switching transistor S7, to perform switching control on the switching transistor S7. The controller 102 includes, for example, a microprocessor and a memory. A user may write, to the memory in advance, an instruction sequence used to control the alternating current power supply circuit. Therefore, after the controller 102 is started, the microprocessor may execute the instruction sequence stored in the memory, to implement a control process of the alternating current power supply circuit.

In the conventional technology, the power supply circuit is usually adjusted, so that a voltage and a current in the power supply circuit have a same phase. A case in which a voltage and a current of the alternating current input have a same phase is discussed in this specification. When the controller 102 detects that both a live wire voltage of the alternating current input and a live wire voltage of the alternating current output are in a positive period, in the rectifier module 11, the controller 102 controls the switching transistor S4 to be constantly turned off, controls the switching transistor S6 to be constantly turned on, and controls the switching transistor S3 and the switching transistor S5 to alternately emit a wave; in the inverter module 12, the controller 102 controls the switching transistor S8 to be constantly turned off, controls the switching transistor S9 to be constantly turned on, and controls the switching transistor S7 and the switching transistor S10 to alternately emit a wave.

In this case, on a side of the rectifier module 11, for example, if the switching transistor S3 is first turned on, a current flow direction is $L_i$ (the live wire of the alternating current input)→L1→Diode S3→N (namely, the zero wire). In this case, the positive electrode of the capacitor C1 has a potential of $+V_b$ volts, and the $+V_b$ volts is usually large, for example, +400 V. The negative electrode of the capacitor C1 is connected to the N wire, and therefore is 0 V. In other words, if a voltage of the capacitor C1 is 400 V, and the live wire of the alternating current input has a potential of +220 V, a voltage of the inductor L1 is 220−400=−180 V. Based on a formula Udt=Ldi, because the voltage of the inductor L1 has a negative value, and a current of the inductor L1 is a positive current, it can be learned that the current of the inductor L1 gradually decreases. In other words, the inductor L1 is discharging. Then, the switching transistor S3 is turned off, and the switching transistor S5 is turned on. In this case, the current flow direction is $L_i$→L1→Switching transistor S5→Diode S6→N, and the voltage of the inductor L1 is +220 V. Based on the formula Udt=Ldi, because the voltage of the inductor L1 has a positive value and the current has a positive value, it can be learned that the current of the inductor L1 gradually increases. In other words, the inductor L1 is being charged. When the switching transistor S5 is turned off, a current in the switching transistor S5 increases to a large current, and a voltage between two ends of the switching transistor S5 is small but is not zero, for example, 1 V. Therefore, based on a formula P=UI, when the switching transistor S5 is turned off, energy consumption inside the switching transistor S5 is very large.

On a side of the inverter module 12, for example, the switching transistor S7 is first turned on, and a current flow direction is Capacitor N→C1→Switching transistor S7→Inductor L2→$L_o$, to charge the inductor L2. Then, the switching transistor S7 is turned off, the switching transistor S10 is turned on, the inductor L2 starts to discharge, and the current flow is N→Diode S10→Switching transistor S9→Inductor L2→N. After the switching transistor S10 is turned off, the current flow direction may still be N→Diode S10→Switching transistor S9→Inductor L2→N. In this case, an upper end of the switching transistor S7 is connected to the positive electrode of the capacitor C1 and has a potential of +$V_b$ volts (for example, +400 V), and a lower end of the switching transistor S7 is connected to the zero wire and has a potential of 0 V. Therefore, when the switching transistor S7 is turned on again, there is a very large voltage between the source and the drain of the switching transistor S7. Based on a power formula P=U*I, it can be learned that when the switching transistor S7 is turned on, energy consumption inside the switching transistor S7 is very large.

When the controller 102 detects that both the live wire voltage of the alternating current input and the live wire voltage of the alternating current output are in a negative half period, as shown in FIG. 1, because the branch 112 and the branch 111 in the rectifier module 11 are symmetrical, there is also a hard switching power loss problem that the switching transistor S6 is turned off in case of a large current, and because the branch 125 and the branch 124 in the inverter module 12 are symmetrical, there is also a hard switching power loss problem that the switching transistor S8 is turned on at a large voltage.

It can be learned that, in the existing alternating current power supply circuit, a power loss of a switching component is very large, leading to low conversion efficiency of the alternating current power supply, increasing operation costs, and causing a resource waste.

Figure 2:
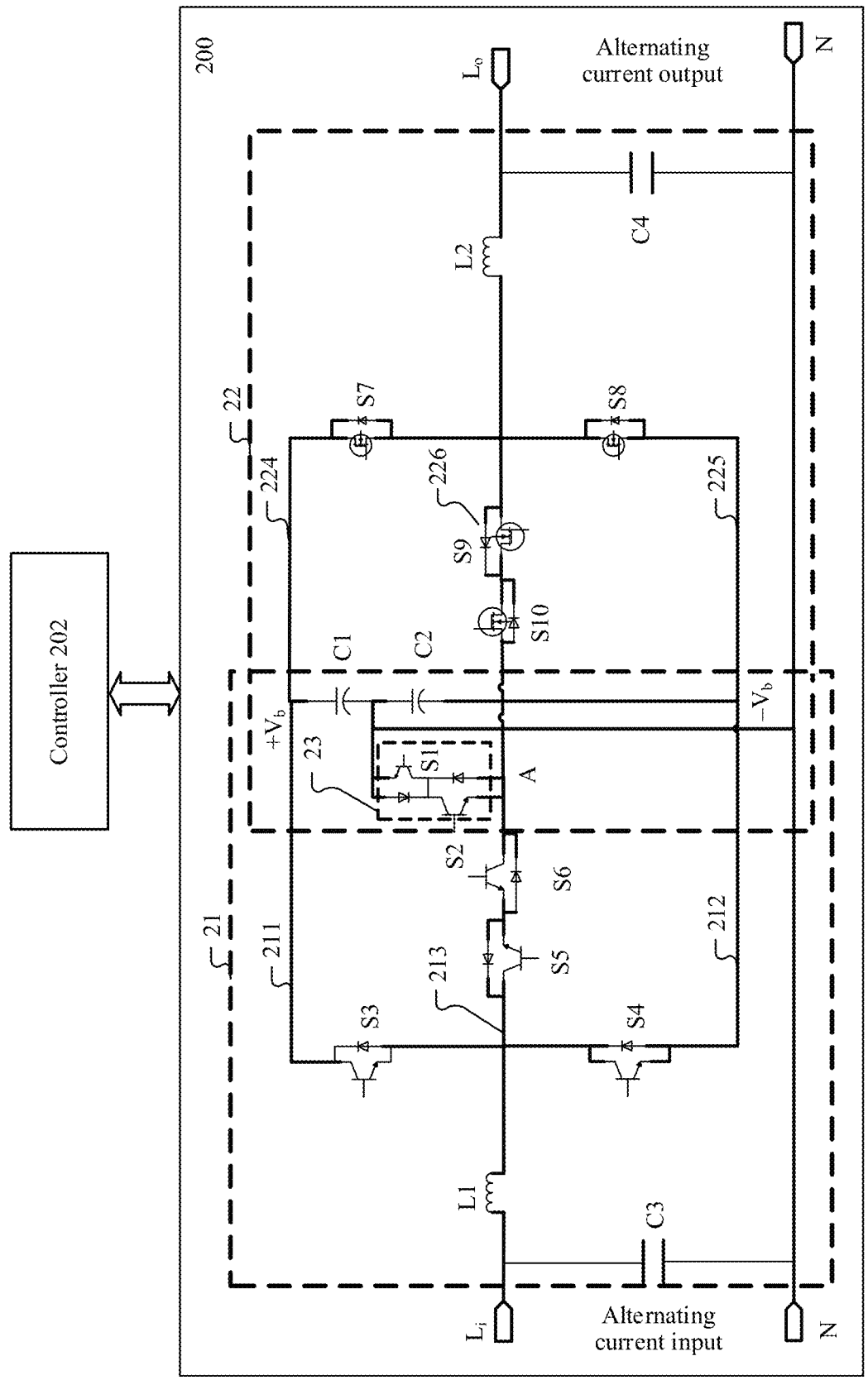
FIG. 2 is a schematic diagram of a structure of an alternating current power supply according to an embodiment of this application.

FIG. 2 is a schematic diagram of a structure of an alternating current power supply according to an embodiment of this application. As shown in FIG. 2, the alternating current power supply includes an alternating current power supply circuit 200 and a controller 202. The alternating current power supply circuit 200 includes a rectifier module 21 and an inverter module 22. The rectifier module 21 has a three-level rectifier topology structure. Specifically, as shown in FIG. 2, the rectifier module 21 includes an inductor L1, a capacitor C1, a capacitor C2, a capacitor C3, a branch 211, a branch 212, and a branch 213. A left end of the inductor L1 is connected to a live wire $L_i$ of an alternating current input, and a right end of the inductor L1 is connected to a common end of the branch 211, the branch 212, and the branch 213. The other end of the branch 211 is connected to a positive electrode of the capacitor C1, the other end of the branch 212 is connected to a negative electrode of the capacitor C2, and the other end of the branch 213 is connected to a common end of the capacitor C1 and the capacitor C2, and is connected to a zero wire (N wire) of the alternating current input. The capacitor C1 and the capacitor C2 are connected in series, and the capacitor C1 and the capacitor C2 are bus capacitors, and serve as energy storage capacitors in the power supply circuit. A positive electrode of the capacitor C1 has, for example, a bus potential of +$V_b$ volts, and a negative electrode of the capacitor C2 has, for example, a bus potential of −$V_b$ volts. Although the capacitor C1 and the capacitor C2 are shown as polar capacitors in FIG. 2, it can be understood that the capacitor C1 and the capacitor C2 are not limited to polar capacitors. The capacitor C3 is connected to the live wire and the zero wire of the alternating current input, and the capacitor C3 is a non-polar capacitor, and is configured to filter the alternating current input, to reduce a ripple current.

As shown in FIG. 2, the branch 211 includes a switching component S3, the switching component S3 includes a switching transistor S3 and a diode S3, and the switching transistor S3 is, for example, an IGBT transistor shown in FIG. 2, so that an emitter (E electrode) of the switching transistor S3 is connected to the inductor L1, and a collector (C electrode) of the switching transistor S3 is connected to the positive electrode of the capacitor C1. The branch 212 includes a switching component S4, the switching component S4 includes a switching transistor S4 and a diode S4, a collector of the switching transistor S4 is connected to the inductor L1, and an emitter of the switching transistor S4 is connected to the negative electrode of the capacitor C2. The branch 213 includes a switching component S5 and a switching component S6 that are reversely connected in series, the switching component S5 includes a switching transistor S5 and a diode S5, the switching component S6 includes a switching transistor S6 and a diode S6, a collector of the switching transistor S5 is connected to the inductor L1, and an emitter of the switching transistor S5 is connected to an emitter of the switching transistor S6.

Different from the alternating current power supply circuit in the conventional technology shown in FIG. 1, in FIG. 2, the branch 213 further includes a soft switching cell 23 including a switching component S1 and a switching component S2. The switching component S1 includes a switching transistor S1 and a diode S1, and the switching component S2 includes a switching transistor S2 and a diode S2. The switching transistor S1 and the switching transistor S2 are reversely connected in series. Specifically, for example, as shown in FIG. 2, the switching transistor S1 is an IGBT transistor, an emitter of the switching transistor S1 is connected to the common end of the capacitor C1 and the capacitor C2 and is connected to the zero wire, a collector of the switching transistor S1 is connected to a collector of the switching transistor S2, and an emitter of the switching transistor S2 is connected to a collector of the switching transistor S6. Herein, although the soft switching cell 23 shown in FIG. 2 is shown, and the switching transistor S1 and the switching transistor S2 are shown as IGBT transistors, this embodiment of this application is not limited thereto. For example, the switching transistor S1 and the switching transistor S2 each may be any fully controlled switching transistor, and a connection manner of the switching transistor S1 and the switching transistor S2 may be as follows: The collector of the switching transistor S1 is connected to the common end of the capacitor C1 and the capacitor C2 and is connected to the zero wire, the emitter of the switching transistor S1 is connected to the emitter of the switching transistor S2, and the collector of the switching transistor S2 is connected to the collector of the switching transistor S6.

The inverter module 22 has a three-level inverter topology structure. Specifically, as shown in FIG. 2, the inverter module 22 includes an inductor L2, the capacitor C1, the capacitor C2, a capacitor C4, a branch 224, a branch 225, and a branch 226. A right end of the inductor L2 is connected to a live wire $L_O$ of an alternating current output, and a left end of the inductor L2 is connected to a common end of the branch 224, the branch 225, and the branch 226. The other end of the branch 224 is connected to a positive electrode of the capacitor C1, the other end of the branch 225 is connected to a negative electrode of the capacitor C2, the other end of the branch 226 is connected to the common end of the capacitor C1 and the capacitor C2, and is connected to a zero wire of the alternating current output, and the zero wire of the alternating current input is connected to the zero wire of the alternating current output. The capacitor C4 is connected to the live wire ($L_0$ wire) and the zero wire (N wire) of the alternating current output, and is configured to filter the alternating current output, to reduce a ripple current, so that an output current is more stable.

As shown in FIG. 2, the branch 224 includes a switching component S7, the switching component S7 includes a switching transistor S7 and a diode S7, and the switching transistor S7 is, for example, a MOSFET transistor shown in FIG. 2, so that a drain (D electrode) of the switching transistor S7 is connected to the positive electrode of the capacitor C1, and a source (S electrode) of the switching transistor S7 is connected to the inductor L2. The branch 225 includes a switching component S8, the switching component S8 includes a switching transistor S8 and a diode S8, a drain of the switching transistor S8 is connected to the inductor L2, and a source of the switching transistor S8 is connected to the negative electrode of the capacitor C2. The branch 226 includes a switching component S9 and a switching component S10 that are reversely connected in series, a source of a switching transistor S9 in the switching component S9 is connected to the inductor L2, and a drain of the switching transistor S9 is connected to a drain of a switching transistor S10 of the switching component S10.

Different from the alternating current power supply circuit shown in FIG. 1, in FIG. 2, the branch 226 further includes the soft switching cell 23. Specifically, a source of the switching transistor S10 is connected to the emitter of the switching transistor S2, so that the branch 226 is connected to the common end of the capacitor C1 and the capacitor C2 by using the soft switching cell 23 and is connected to the zero wire. In FIG. 2, the switching transistors S1 to S10 are not limited to the IGBT transistor or the MOSFET transistor shown in FIG. 2, but may be any fully controlled switching transistor. In addition, the switching transistors S1 to S10 may be a same switching transistor or different switching transistors.

The controller 202 may be connected to the live wire of the alternating current input and the live wire of the alternating current output, and is configured to monitor whether the live wire voltage of the alternating current input and the live wire voltage of the alternating current output are positive voltages or negative voltages. The controller 202 is further connected to each of the switching transistors S1 to S10 in the circuit 200, to control turning on or turning off of each of the switching transistors based on a monitored voltage value. The controller 202 includes, for example, a microprocessor and a memory. A user may write, to the memory in advance, an instruction sequence used to control the alternating current power supply circuit. Therefore, after the controller 202 is started, the microprocessor may execute the instruction sequence stored in the memory, to implement a control process of the alternating current power supply circuit.

The following specifically discusses a process of controlling the alternating current power supply circuit 200 by the controller 202. In the following discussed alternating current power supply circuit 200, a voltage and a current on a rectifier side have a same phase.

Figure 3:
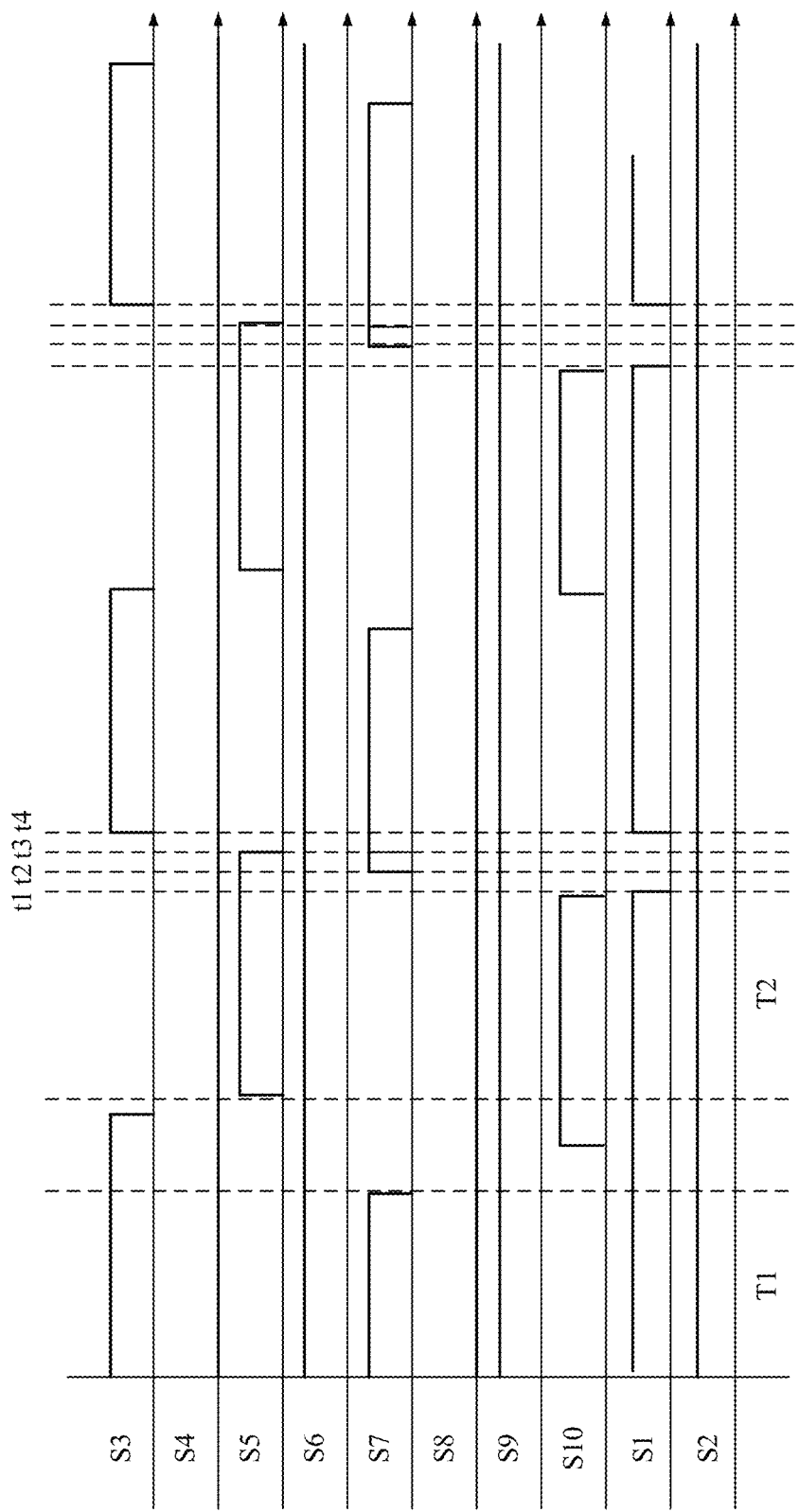
FIG. 3 is a diagram of control logic of each switching transistor in FIG. 2 in a first condition.

FIG. 3 is a diagram of control logic in which a controller 202 controls each switching transistor in FIG. 2 in a first condition. The first condition is that the live wire voltage of the alternating current input and the live wire voltage of the alternating current output each are a positive voltage. On the rectifier side, the alternating current power supply circuit may be adjusted, to ensure that a voltage and a current in the circuit have a same phase. In other words, a current flowing through the inductor L1 on the rectifier side is a positive current. When the current flowing through the inductor L1 is from left to right, it may be determined that the current flowing through the inductor L1 is a positive current.

Refer to FIG. 3, when the controller 202 determines, by monitoring the alternating current power supply circuit 200, that the circuit 200 meets the first condition, the controller 202 controls each switching transistor as follows: On the rectifier side, the controller 202 controls the switching transistor S3 and the switching transistor S5 to alternately emit a wave, controls the switching transistor S4 to be constantly turned off, and controls the switching transistor S6 to be constantly turned on; on an inverter side, the controller 202 controls the switching transistor S7 and the switching transistor S10 to alternately emit a wave, controls the switching transistor S8 to be constantly turned off, and controls the switching transistor S9 to be constantly turned on; in the soft switching cell, the controller 202 controls the switching transistor S2 to be constantly turned on, and controls the switching transistor S1 to be turned off only in a time period t1-t4 in FIG. 3 and to be turned on in another time period. The time period t1-t4 may be referred to as a soft switching time zone. The switching transistor S1 is turned off in the soft switching time zone, so that zero voltage switching of the switching transistor S7 is performed and the switching transistor S5 is turned off in a case of a small current. This is to be described in detail below. A time period between a moment t1 and a moment t2 is a dead time period, a time period between a moment t3 and a moment t4 is also a dead time period, and the dead time period is a non-operating time period with a specific length in a switching power supply system. For example, a length of the non-operating time period is one microsecond.

Provided that the first condition is met, a soft switching effect in this embodiment of this application may be implemented by using the control logic shown in FIG. 3 in both a case in which a voltage and a current of the live wire of the alternating current output have a same phase and a case in which the voltage and the current of the live wire of the alternating current output have different phases. In the following, FIG. 4 to FIG. 7 correspond to the case in which the voltage and the current of the live wire of the alternating current output have a same phase, and FIG. 8 corresponds to the case in which the voltage and the current of the live wire of the alternating current output have different phases.

Figure 4:
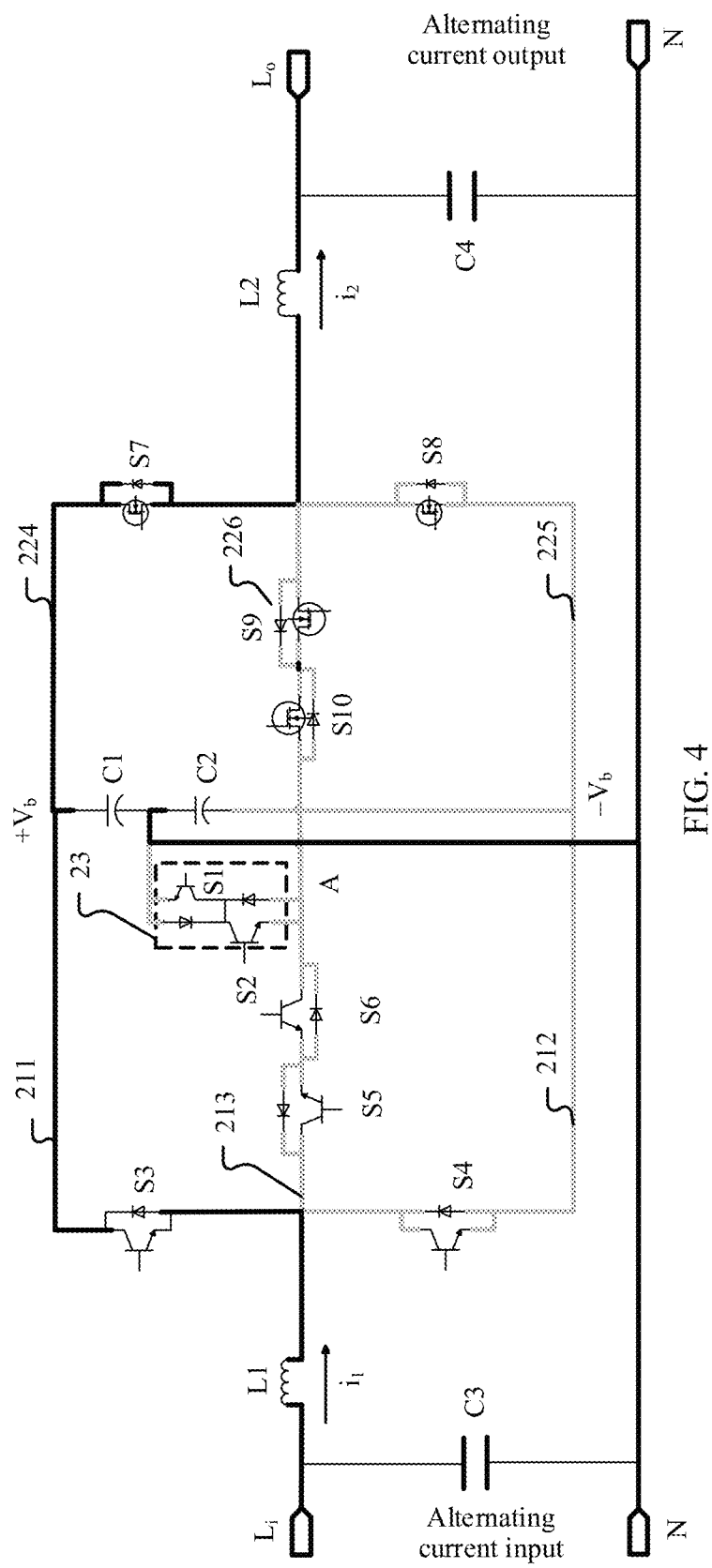
FIG. 4 is a schematic diagram of a control state of an alternating current power supply circuit shown in FIG. 2.

FIG. 4 is a schematic diagram of a control state of an alternating current power supply circuit shown in FIG. 2. The control state shown in FIG. 4 corresponds to a time period T1 in FIG. 3, and the control state shown in FIG. 4 is a state existing when a voltage and a current on the inverter side have a same phase. In other words, a direction of a current $i_2$ of the inductor L2 is from left to right, and is a positive current. Specifically, as shown in FIG. 3, on the rectifier side, in the time period T1, the switching transistor S3 is turned on, both the switching transistor S5 and the switching transistor S4 are turned off, and both a conduction direction of the diode S5 and a conduction direction of the diode S4 are opposite to a direction of a current $i_1$. Therefore, as shown by a black line loop on the rectifier side in FIG. 4, a current flow direction is $L_i$→Inductor L1→Switching transistor S3→Capacitor C1→N. With reference to the foregoing description, in this state, the potential $+V_b$ of the positive electrode of the capacitor C1 is large (for example, 400V), and the live wire ($L_i$) voltage of the alternating current input is small (for example, 220 V), so that the voltage of the inductor L1 is a negative voltage. Based on the formula Udt=Ldi, because the voltage of the inductor L1 has a negative value, the current has a positive value, the current $i_1$ of the inductor L1 gradually decreases, and the inductor L1 is in an energy release process in this state.

On the inverter side, in the time period T1, the switching transistor S7 is turned on, and because both the switching transistor S10 and the switching transistor S8 are turned off, and both a conduction direction of the diode S10 and a conduction direction of the diode S8 are opposite to a direction of a current from the switching transistor S7, as shown by a black line loop on the inverter side in FIG. 4, a current flow direction is N→Capacitor C1→Switching transistor S7→Inductor L2→$L_o$. In this state, it is assumed that an amplitude of the live wire ($L_o$) voltage is 110 V. Therefore, the voltage of the inductor L2 is greater than or equal to 400−110=290 V. In other words, the voltage of the inductor L2 is greater than zero, and the current 12 of the inductor L2 is a positive current. Based on the formula Udt=Ldi, it can be learned that the current $i_2$ is gradually increases. In other words, the inductor L2 is in an energy storage stage.

Figure 5:
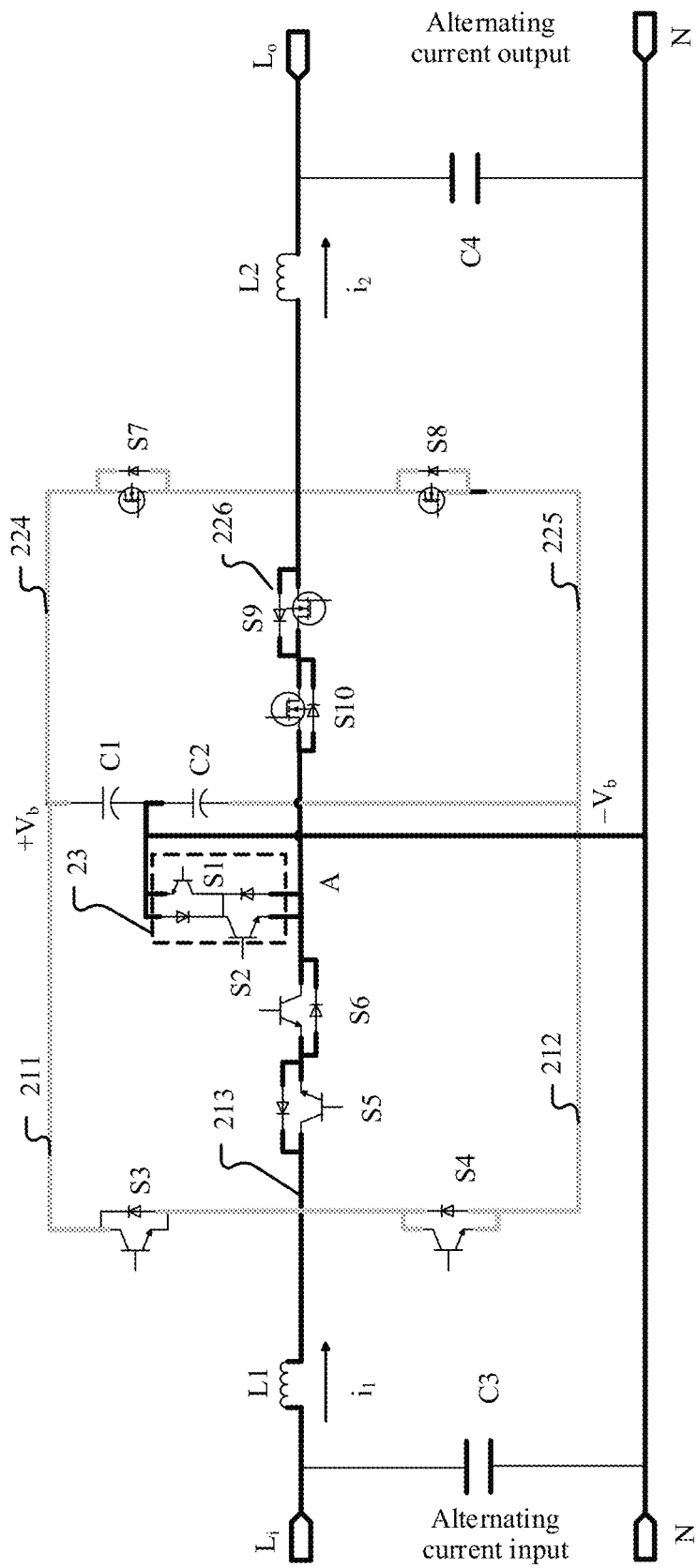
FIG. 5 is a schematic diagram of another control state of an alternating current power supply circuit shown in FIG. 2.

FIG. 5 is a schematic diagram of another control state of an alternating current power supply circuit shown in FIG. 2. The control state shown in FIG. 5 corresponds to a time period T2 in FIG. 3. As shown in FIG. 3, in the time period T2, on the rectifier side, the switching transistor S3 is turned off, the switching transistor S5 is turned on, the switching transistor S4 is turned off, the switching transistor S1 is turned on, and the switching transistor S2 is turned on. After the switching transistor S5 is turned on, a current loop shown by a black line loop on the rectifier side in FIG. 5 is $L_i$→Inductor L1→Switching transistor S5→Diode S6→Switching component S2→Switching component S1→N. The right end of the inductor L1 is connected to the zero wire. In other words, a potential of the right end of the inductor L1 is 0 V, and is less than a potential of the positive electrode of the capacitor C1. Therefore, the diode S3 is cut off. In other words, there is only one loop shown by a black line in FIG. 5 on the rectifier side. In addition, in this loop, the voltage of the inductor L1 becomes the live wire voltage of the alternating current input, for example, +220 V. In other words, the voltage of the inductor L1 is greater than zero. Based on the formula Udt=Ldi, because the voltage U of the inductor L1 has a positive value and the current has a positive value, a current $i_1$ of the inductor L1 gradually increases. In other words, the inductor L1 is in an energy storage stage. In addition, as shown by the black line loop on the rectifier side in FIG. 5, the current $i_1$ flows from bottom to top in the switching component S1.

In the time period T2, on the inverter side, the switching transistor S7 is turned off, the switching transistor S10 is turned on, the switching transistor S8 is turned off, the switching transistor S9 is turned on, the switching transistor S1 is turned on, and the switching transistor S2 is turned on. After the switching transistor S7 is turned off, a current of the inductor L2 does not change instantly. In other words, the current of the inductor L2 is still in a direction of $i_2$ shown in FIG. 5. As shown by the black line loop on the inverter side in FIG. 5, a current flow direction on the inverter side is N→Switching component S1→Switching component S2→Diode S10→Switching transistor S9→Inductor L2→$L_o$. In the black line loop on the inverter side in FIG. 5, it is assumed that an amplitude of the live wire voltage of the alternating current output is 110 V, the voltage of the inductor L2 has a negative value, a current $i_2$ is a positive current as shown in FIG. 5, and it can be learned, based on the formula Udt=Ldi, that the current $i_2$ of the inductor L2 gradually decreases. In other words, the inductor L2 is in an energy release stage. In addition, as shown by the black line loop on the inverter side in FIG. 5, the current 12 flows from top to bottom in the switching component S1.

At an end of the time period T2, the current $i_1$ has increased to a larger value and the current $i_2$ has decreased to a smaller value. In other words, the current $i_1$ is greater than a value of the current $i_2$. In other words, in the switching component S1, a direction of a total current is flowing through the switching transistor S1 from bottom to top.

Figure 6:
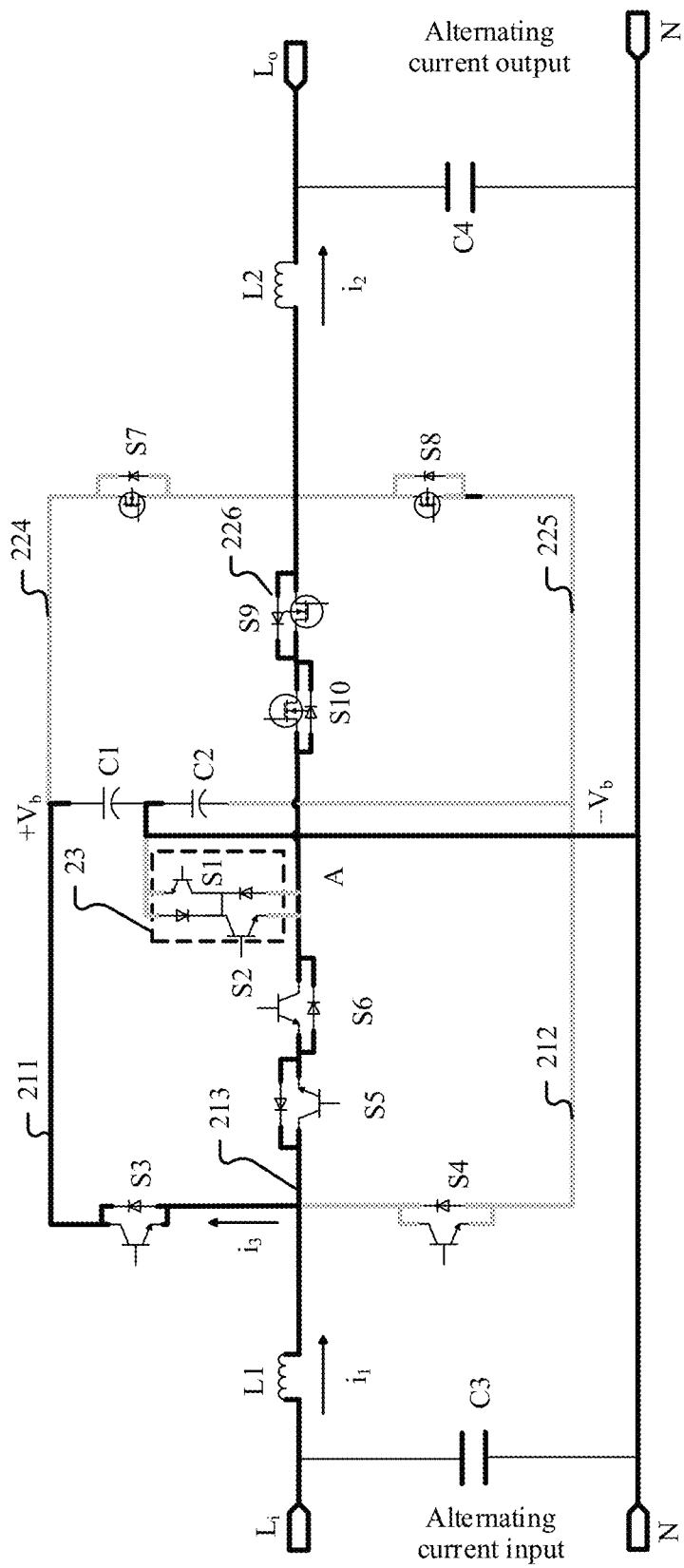
FIG. 6 is a schematic diagram of another control state of an alternating current power supply circuit shown in FIG. 2.

FIG. 6 is a schematic diagram of another control state of an alternating current power supply circuit shown in FIG. 2. The control state shown in FIG. 6 corresponds to a moment t1 in FIG. 3. As shown in FIG. 3, the switching transistor S1 is turned off at the moment t1. As described above with reference to FIG. 5, before the moment t1, a current in an upward direction flows in the switching transistor S1, and because a conduction direction of the diode S1 is opposite to a current flow direction, the diode S1 is in a cutoff state. Therefore, after the switching transistor S1 is turned off at the moment t1, the switching component S1 breaks a connection between a point A in FIG. 6 and the zero wire. After the switching component S1 breaks the connection between the point A and the zero wire, a current $i_1$ of the inductor L1 and a current $i_2$ of the inductor L2 do not change instantly. As described above, $i_1$ is greater than $i_2$. Therefore, as shown in FIG. 6, a part of the current $i_3$ of the inductor L1 conducts the diode S3 and flows to the capacitor C1. After the diode S3 is conducted, the point A is connected to the positive electrode of the capacitor C1 by using the diode S6, the switching transistor S5, and the diode S3. Therefore, a potential of the point A becomes $+V_b$ volts. The source of the switching transistor S7 is connected to the point A through the switching transistor S9 and the diode S10. Therefore, a potential of the source of the switching transistor S7 is $+V_b$ volts. The drain of the switching transistor S7 is connected to the positive electrode of the capacitor C1. Therefore, a potential of the drain of the switching transistor S7 is also $+V_b$ volts. In other words, after the switching transistor S1 is turned off, the source and the drain of the switching transistor S7 have a same potential ($+V_b$ volts). In other words, a voltage between the source and the drain of the switching transistor S7 is zero voltage.

Figure 7:
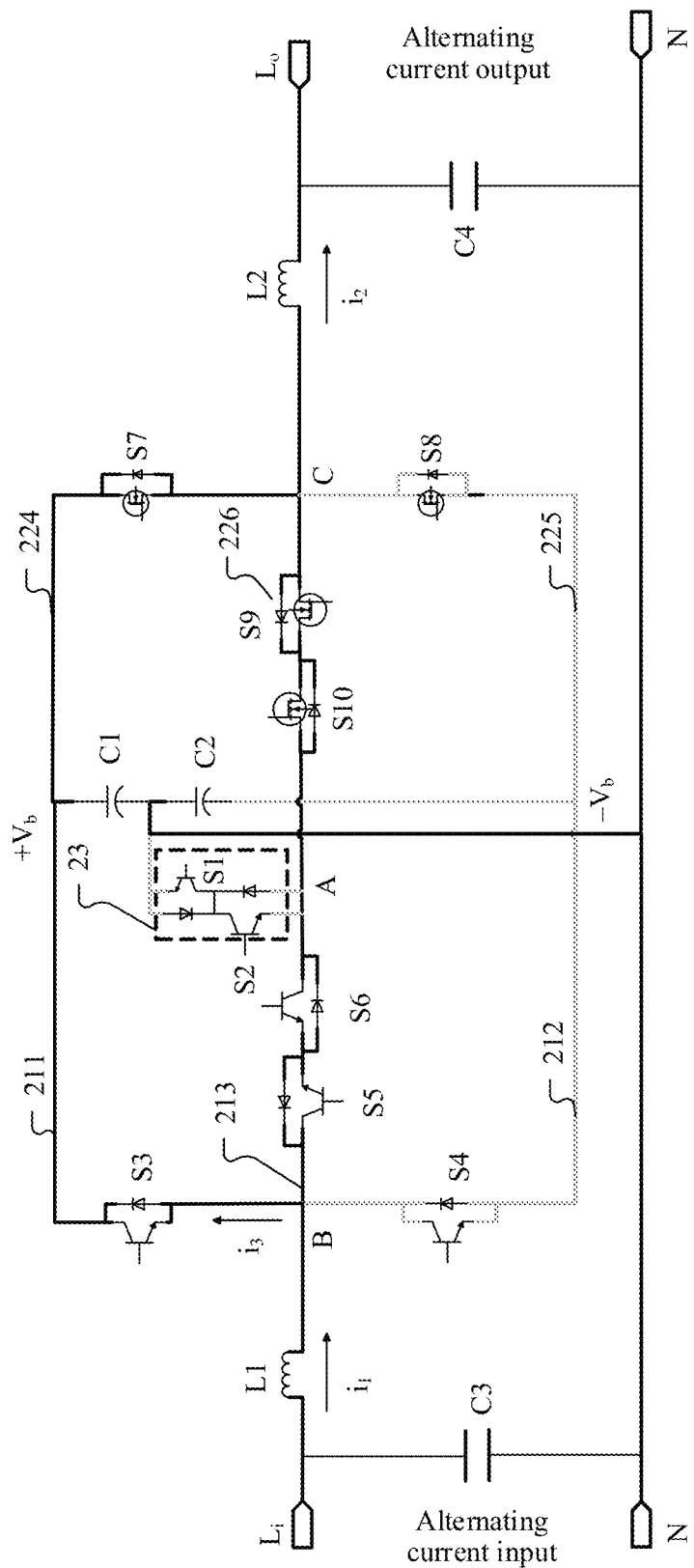
FIG. 7 is a schematic diagram of another control state of an alternating current power supply circuit shown in FIG. 2.

FIG. 7 is a schematic diagram of another control state of an alternating current power supply circuit shown in FIG. 2. The control state shown in FIG. 7 corresponds to a moment t2 in FIG. 3. As shown in FIG. 3, the switching transistor S7 is turned on at the moment t2. As shown in FIG. 6, a voltage between the source and the drain of the switching transistor S7 is zero voltage at the moment t1. Therefore, when the switching transistor S7 is turned on at the moment t2, zero voltage switching (ZVS) of the switching transistor S7 is performed. Compared with a case in which the switching transistor S7 in FIG. 1 is turned on at a large voltage, energy consumption of the switching transistor S7 is greatly reduced, and efficiency of the alternating current power supply is improved. In addition, as shown in FIG. 7, after the switching transistor S7 is turned on, two branches are connected between a point B and a point C, one branch on an upper side includes the diode S3 and the switching transistor S7, and the other branch on a lower side includes the switching transistor S5, the diode S6, the diode S10, and the switching transistor S9. In other words, a quantity of switching components included in the upper branch is less than a quantity of switching components included in the lower branch. It is assumed that a resistance value of each switching component is R. Therefore, a total resistance value of the upper branch is 2R, a total resistance value of the lower branch is 4R, and it can be learned, based on a current calculation formula i=U/R, that a current of the upper branch is twice of a current of the lower branch. In other words, after a current $i_1$ flows to the point B, a larger current $i_3$ flows to the diode S3, and a smaller current flows to the switching transistor S5.

Therefore, as shown in FIG. 3, when the switching transistor S5 is turned off at a moment t3, the switching transistor S5 is turned off at zero voltage in a case of a low current, to further reduce energy consumption existing when the switching transistor S5 is turned off. At a moment t4, the switching transistor S1 is turned on, and the switching transistor S3 is turned on, to enter a next period of the control logic.

Figure 8:
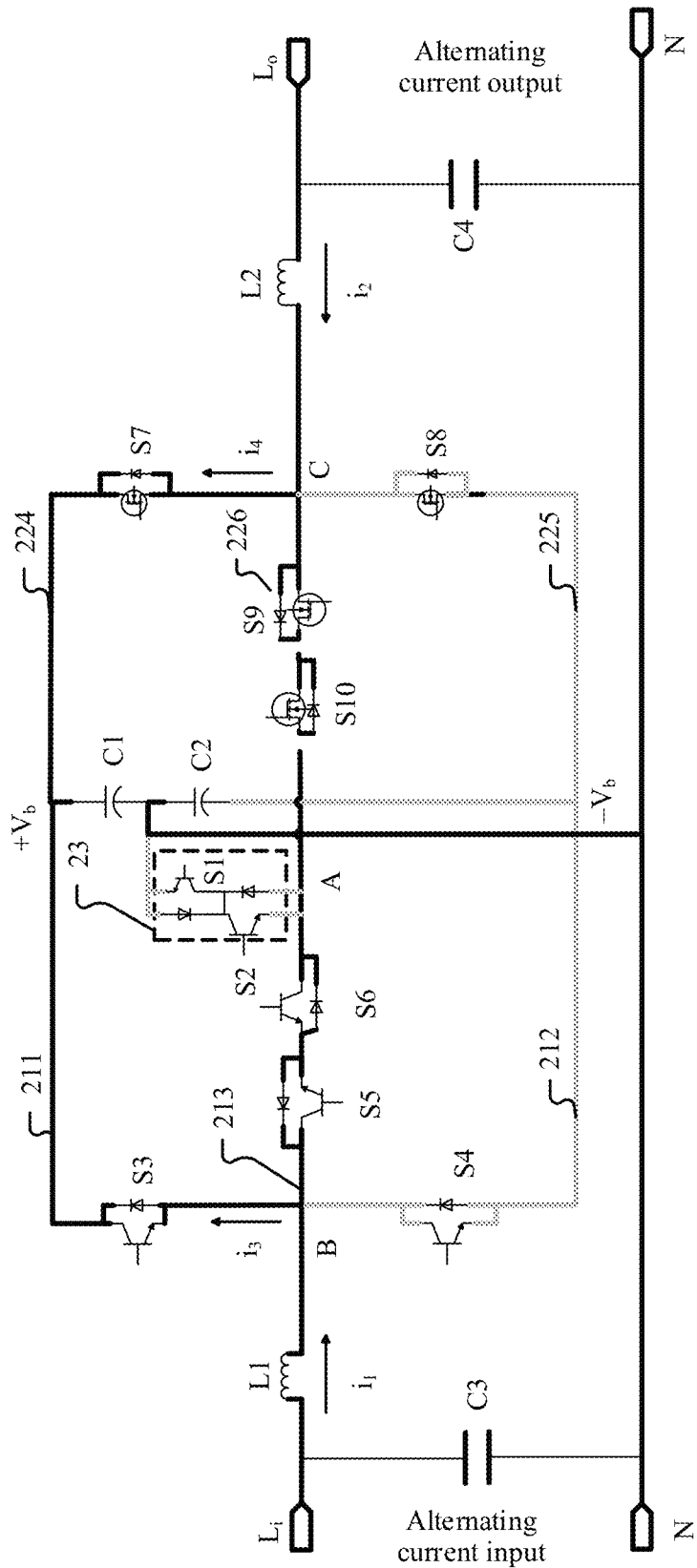
FIG. 8 is a schematic diagram of another control state of an alternating current power supply circuit shown in FIG. 2.

FIG. 8 is a schematic diagram of another control state of an alternating current power supply circuit shown in FIG. 2. The control state shown in FIG. 8 corresponds to a moment t1 in FIG. 3. In FIG. 8, a direction of a current $i_2$ of the inductor L2 is from right to left. In other words, a current on the inverter side is a negative current, and the current and the voltage have different phases. In this case, before the moment t1, both a current $i_1$ and the current 12 pass through the switching component S1 from bottom to top. In other words, a current in the switching component S1 flows upward through the switching transistor S1, and the diode S1 is also in a cutoff state. Therefore, after the switching transistor S1 is turned off at the moment t1, similar to the state in FIG. 5, the switching component S1 breaks a connection between a point A and the zero wire. Therefore, when the current $i_1$ flows through a point B, a large part of the current 13 flows to the diode S3 and conducts the diode S3, and when the current $i_2$ flows through a point C, a large part of the current $i_4$ flows to the diode S7 and conducts the diode S7. At the moment t2, when the switching transistor S7 is turned on, because the diode S7 has been conducted, a voltage between the source and the drain of the switching transistor S7 is zero. Therefore, similarly, zero voltage switching of the switching transistor S7 is performed. Similarly, when the switching transistor S5 is turned off at a moment t3, the large part of the current $i_3$ in the current $i_1$ of the inductor L1 flows to the diode S3. Therefore, the switching transistor S5 is turned off at zero voltage in a case of a small current. In other words, in the first condition, when the current on the inverter side and the voltage have different phases, by using the control logic in FIG. 3, zero voltage switching of the switching transistor S7 may still be performed, and the switching transistor S5 may still be turned off at zero voltage in a case of a small current.

Although the foregoing describes, by using the control logic shown in FIG. 3 as an example, a case in which a control unit 202 controls the alternating current power supply circuit 200 in the first condition, it can be understood that the control logic used in this embodiment of this application is not limited to that shown in FIG. 3. For example, with reference to the foregoing description in FIG. 5, in the time period T2, the current $i_1$ gradually increases, and the current $i_2$ gradually decreases; when the current $i_1$ is greater than the current $i_2$, an upward current flows in the switching transistor S1. Provided that an upward current flows in the switching transistor S1, a circuit state shown in FIG. 6 can be realized by turning off the switching transistor S1. Therefore, in the control logic of the circuit 200 in the first condition, it is not specified that the switching transistor S1 is turned off at the moment t1 before the switching transistor S7 is turned on. Instead, the switching transistor S1 may be turned off at a moment before the moment t1, provided that an upward current flows in the switching transistor S1 at the turn-off moment.

In addition, when the switching transistor S3 is turned on again in FIG. 3 to start a second control period, a state of the circuit 200 is shown in FIG. 4. Both the switching transistor S5 and the switching transistor S10 are in the cutoff state, and no current flows through the branch 213 and the branch 226. Therefore, even if the switching transistor S1 is turned on at the moment t4, no current passes through the switching transistor S1. In other words, it is not specified that the switching transistor S1 is turned on at the moment t4 as shown in FIG. 3. Instead, the switching transistor S1 may be turned on when the switching transistor S10 is turned on, to turn on the branch 226.

Figure 9:
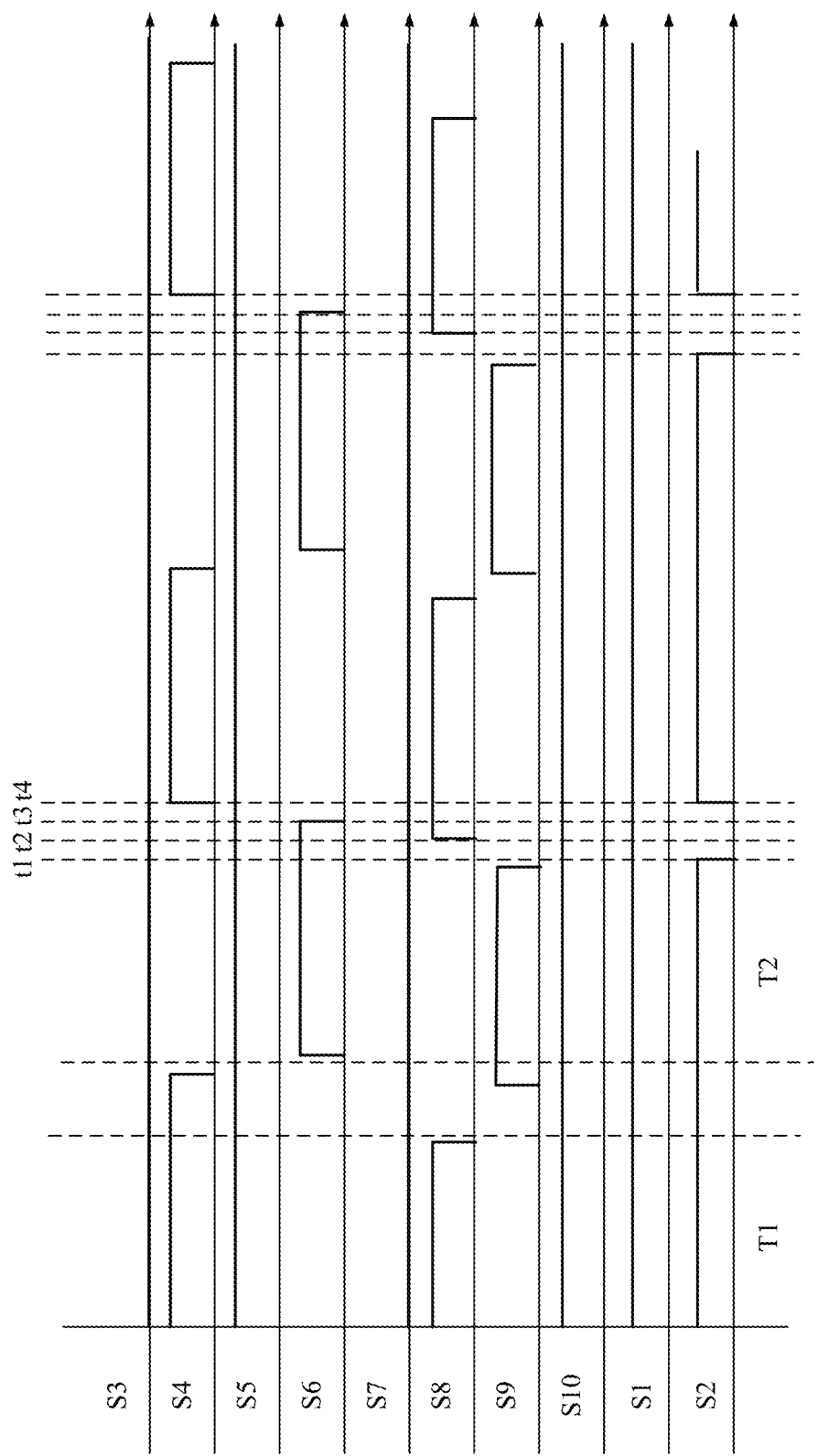
FIG. 9 is a diagram of control logic of each switching transistor in FIG. 2 in a second condition.

FIG. 9 is a diagram of control logic in which a controller 202 controls each switching transistor in FIG. 2 in a second condition. The second condition is that the live wire voltage of the alternating current input and the live wire voltage of the alternating current output each are a negative voltage. Similarly, the control logic shown in FIG. 9 is applicable to a case in which a voltage and a current on a rectifier side have a same phase. In addition, the control logic shown in FIG. 9 not only is applicable to a case in which a voltage and a current on an inverter side have a same phase, but also is applicable to a case in which the voltage and the current on the inverter side have different phases.

Refer to FIG. 9, when the controller 202 determines, by monitoring the alternating current power supply circuit 200, that the circuit 200 meets the second condition, the controller 202 controls each switching transistor as follows: On the rectifier side, the controller 202 controls the switching transistor S4 and the switching transistor S6 to alternately emit a wave, controls the switching transistor S3 to be constantly turned off, and controls the switching transistor S5 to be constantly turned on; on the inverter side, the controller 202 controls the switching transistor S8 and the switching transistor S9 to alternately emit a wave, controls the switching transistor S7 to be constantly turned off, and controls the switching transistor S10 to be constantly turned on; in the soft switching cell, the controller 202 controls the switching transistor S1 to be constantly turned on, and controls the switching transistor S2 to be turned off only in a time period t1-t4 in FIG. 9 and to be turned on in another time period. The time period t1-t4 may be referred to as a soft switching time zone. The switching transistor S2 is turned off in the soft switching time zone, so that zero voltage switching of the switching transistor S8 is performed and the switching transistor S6 is turned off at zero voltage in a case of a small current. This is to be described in detail below.

Figure 10:
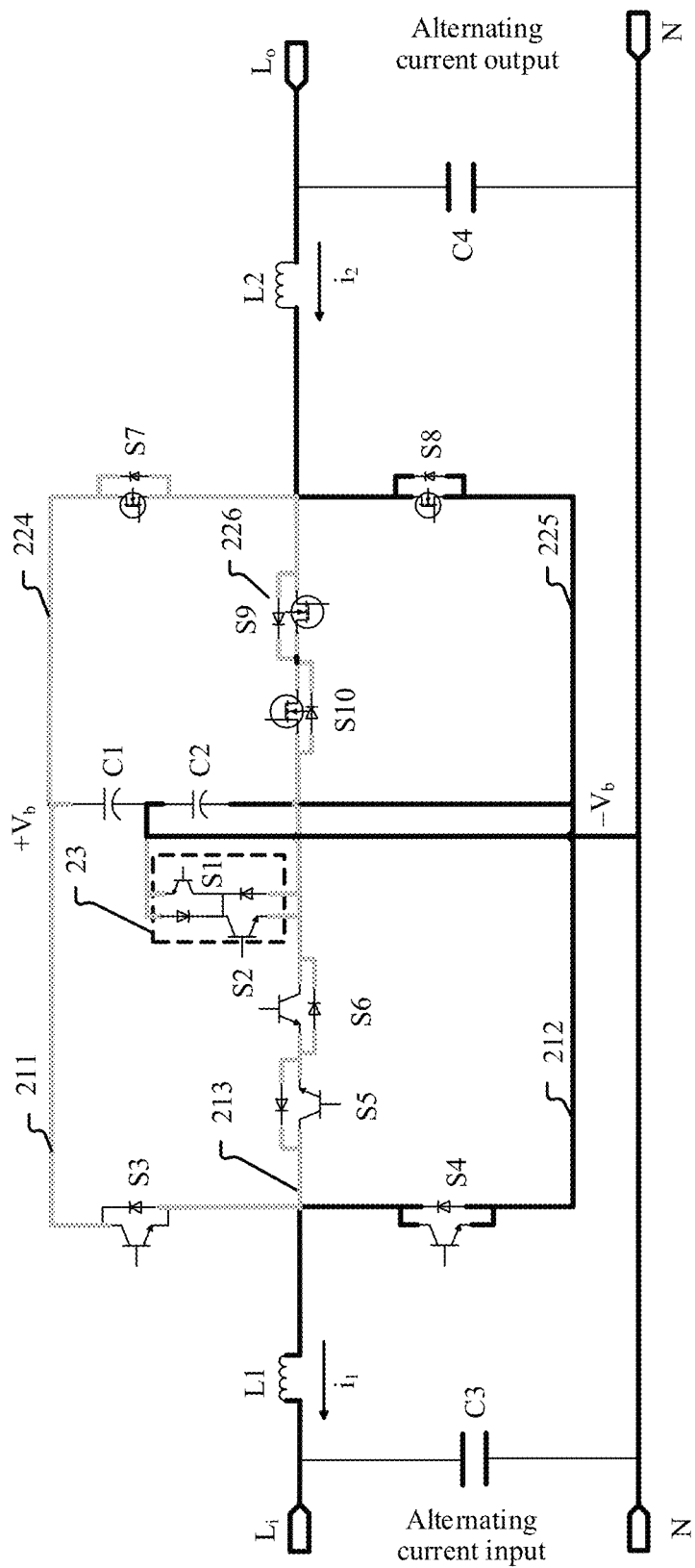
FIG. 10 is a schematic diagram of another control state of an alternating current power supply circuit shown in FIG. 2.

FIG. 10 is a schematic diagram of another control state of an alternating current power supply circuit shown in FIG. 2. The control state shown in FIG. 10 corresponds to a time period T1 in FIG. 9, and in FIG. 10, a current $i_2$ is a negative current. In other words, a voltage and a current on the inverter side have a same phase. Specifically, as shown in FIG. 9, on the rectifier side, in the time period T1, the switching transistor S4 is turned on, both the switching transistor S3 and the switching transistor S6 are turned off, and both a conduction direction of the diode S3 and a conduction direction of the diode S6 are opposite to a direction of a current $i_1$. Therefore, as shown by a black line loop on the rectifier side in FIG. 10, a current flow direction is N→Capacitor C2→Diode S4→L1→$L_i$. With reference to the foregoing description, in this state, a potential $-V_b$ volts of the negative electrode of the capacitor C2 is, for example, $-400$ V, and the live wire ($L_i$) voltage of the alternating current input is, for example, $-220$ V, so that the voltage of the inductor L1 is a positive voltage, the current $i_1$ of the inductor L1 is a negative current, and it can be learned, based on the formula Udt=Ldi, that the current $i_1$ of the inductor L1 gradually decreases, and the inductor L1 is an energy release process in this state.

On the inverter side, in the time period T1, the switching transistor S8 is turned on, and because both the switching transistor S7 and the switching transistor S9 are turned off, and both a conduction direction of the diode S7 and a conduction direction of the diode S9 are opposite to a direction of the current $i_2$, as shown by a black line loop on the inverter side in FIG. 10, a current flow direction is Capacitor $L_o$→Inductor L2→Switching transistor S8→C2→N. In this state, it is assumed that an amplitude of the live wire ($L_o$) voltage is $-110$ V. Therefore, the voltage of the inductor L2 is less than or equal to $-400-(-110)= -290$ V. In other words, the voltage of the inductor L2 is less than zero, and the current $i_2$ of the inductor L2 is a negative current. Based on the formula Udt=Ldi, the current $i_2$ of the inductor L2 gradually increases. In other words, the inductor L2 is in an energy storage stage.

Figure 11:
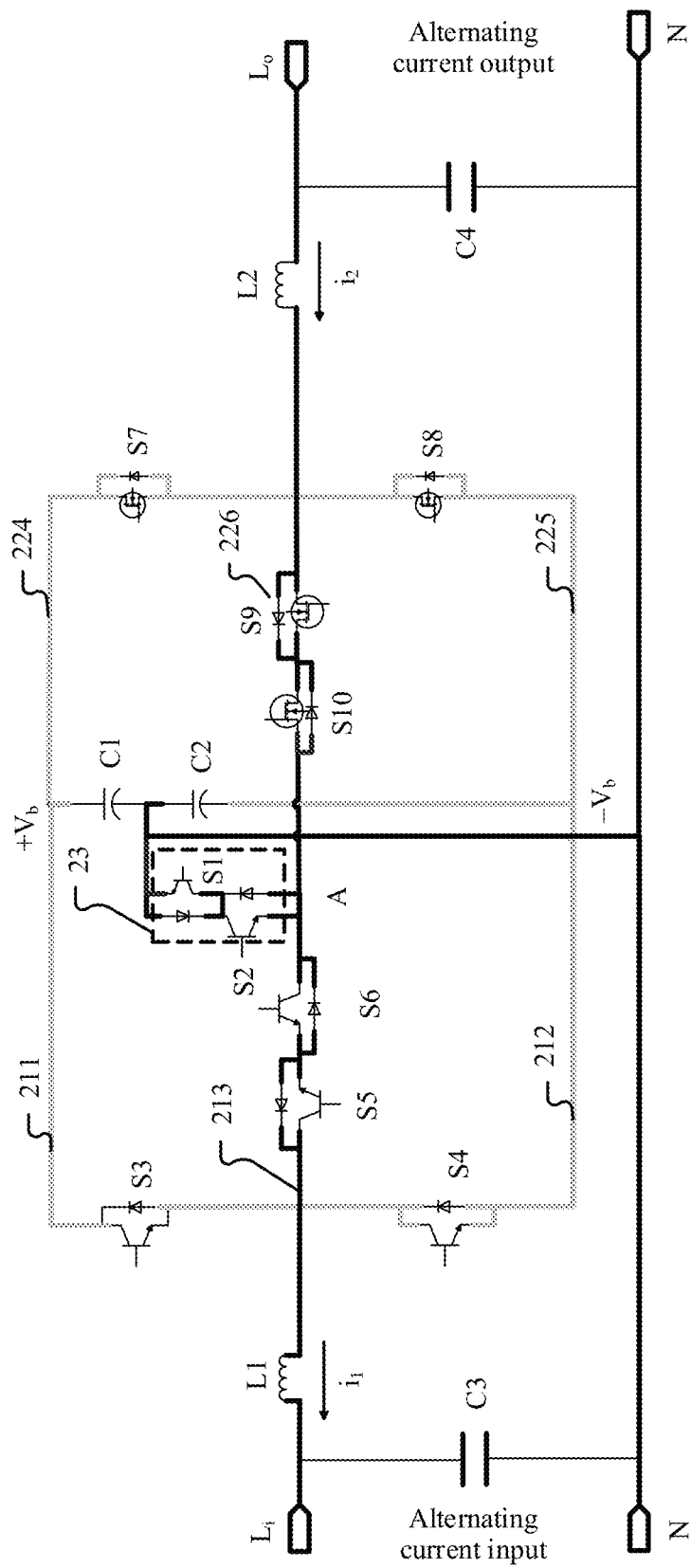
FIG. 11 is a schematic diagram of another control state of an alternating current power supply circuit shown in FIG. 2.

FIG. 11 is a schematic diagram of another control state of an alternating current power supply circuit shown in FIG. 2. The control state shown in FIG. 11 corresponds to a time period T2 in FIG. 9. As shown in FIG. 9, in the time period T2, on the rectifier side, the switching transistor S4 is turned off, the switching transistor S3 is turned off, the switching transistor S5 is turned on, the switching transistor S6 is turned on, the switching transistor S1 is turned on, and the switching transistor S2 is turned on. After the switching transistor S6 is turned on, a current loop shown by a black line loop on the rectifier side in FIG. 11 is N→Switching component S1→Switching component S2→Switching transistor S6→Diode S5→Inductor L1→$L_i$. The right end of the inductor L1 is connected to the zero wire. In other words, a potential of the right end of the inductor L1 is 0 V, and is greater than a potential of the negative electrode of the capacitor C2. Therefore, the diode S4 is cut off. In other words, there is only one loop shown by a black line in FIG. 11 on the rectifier side. In addition, in this loop, the voltage of the inductor L1 becomes the live wire voltage of the alternating current input, for example, $-220$ V. In other words, a voltage of the inductor L1 is less than zero, and a current $i_1$ of the inductor L1 is a negative current. It can be learned, based on the formula Udt=Ldi, that the current $i_1$ of the inductor L1 gradually increases, and the inductor L1 is in an energy storage stage. In addition, as shown by the black line loop on the rectifier side in FIG. 11, the current $i_1$ flows from top to bottom in the switching component S2.

In the time period T2, on the inverter side, the switching transistor S8 is turned off, the switching transistor S9 is turned on, the switching transistor S7 is turned off, the switching transistor S10 is turned on, the switching transistor S1 is turned on, and the switching transistor S2 is turned on. After the switching transistor S8 is turned off, a current of the inductor L2 does not change instantly. In other words, the current of the inductor L2 is still in a direction of $i_2$ shown in FIG. 11. As shown by the black line loop on the inverter side in FIG. 11, a current flow direction on the inverter side is $L_O$→L2→Diode S9→Switching transistor S10→Diode S2→Switching transistor S1→N. In the black line loop on the inverter side in FIG. 11, it is assumed that an amplitude of the live wire voltage of the alternating current output is $-110$ V, a voltage of the inductor L2 has a positive value, and a current $i_2$ of the inductor L2 is a negative current. It can be learned, based on the formula Udt=Ldi, that the current $i_2$ of the inductor L2 gradually decreases, the inductor L2 is in an energy release stage, and as shown by the black line loop on the inverter side in FIG. 11, the current $i_2$ flows from bottom to top in the switching component S2.

At an end of the time period T2, the current $i_1$ has increased to a larger value and the current $i_2$ has decreased to a smaller value. In other words, the current $i_1$ is greater than a value of the current $i_2$. In other words, in the switching component S2, a direction of a total current is flowing through the switching transistor S2 from top to bottom.

Figure 12:
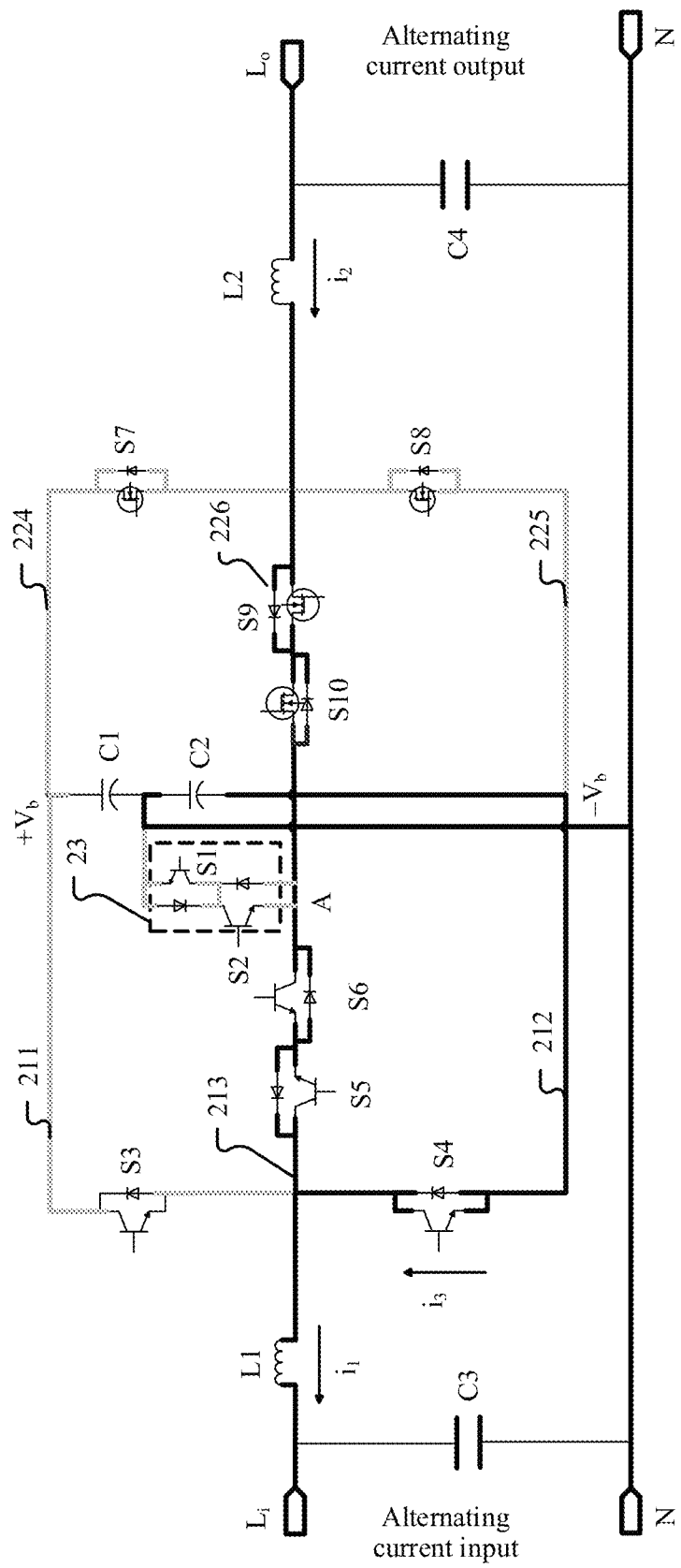
FIG. 12 is a schematic diagram of another control state of an alternating current power supply circuit shown in FIG. 2.

FIG. 12 is a schematic diagram of another control state of an alternating current power supply circuit shown in FIG. 2. The control state shown in FIG. 12 corresponds to a moment t1 in FIG. 9. As shown in FIG. 9, the switching transistor S2 is turned off at the moment t1. As described above with reference to FIG. 11, before the moment t1, a current in a downward direction flows in the switching transistor S2, and because a conduction direction of the diode S2 is opposite to a current flow direction, the diode S2 is in a cutoff state. Therefore, after the switching transistor S2 is turned off at the moment t1, the switching component S2 breaks a connection between a point A and the zero wire. After the switching component S2 breaks the connection between the point A and the zero wire, a current $i_1$ of the inductor $L_i$ and a current $i_2$ of the inductor L2 do not change instantly. As described above, $i_1$ is greater than $i_2$. Therefore, as shown in FIG. 12, a part of the current $i_3$ of the inductor L1 conducts the diode S4. After the diode S4 is conducted, the point A is connected to the negative electrode of the capacitor C2 by using the switching transistor S6, the diode S5, and the diode S4. Therefore, a potential of the point A becomes $-V_b$ volts. The drain of the switching transistor S8 is connected to the point A through the diode S9 and the switching transistor S10. Therefore, a potential of the drain of the switching transistor S8 is also $-V_b$ volts. The source of the switching transistor S8 is connected to the negative electrode of the capacitor C2. Therefore, a potential of the source of the switching transistor S8 is $-V_b$ volts. In other words, after the switching transistor S2 is turned off, the source and the drain of the switching transistor S8 have a same potential ($-V_b$ volts). In other words, a voltage between the source and the drain of the switching transistor S8 is zero voltage.

Figure 13:
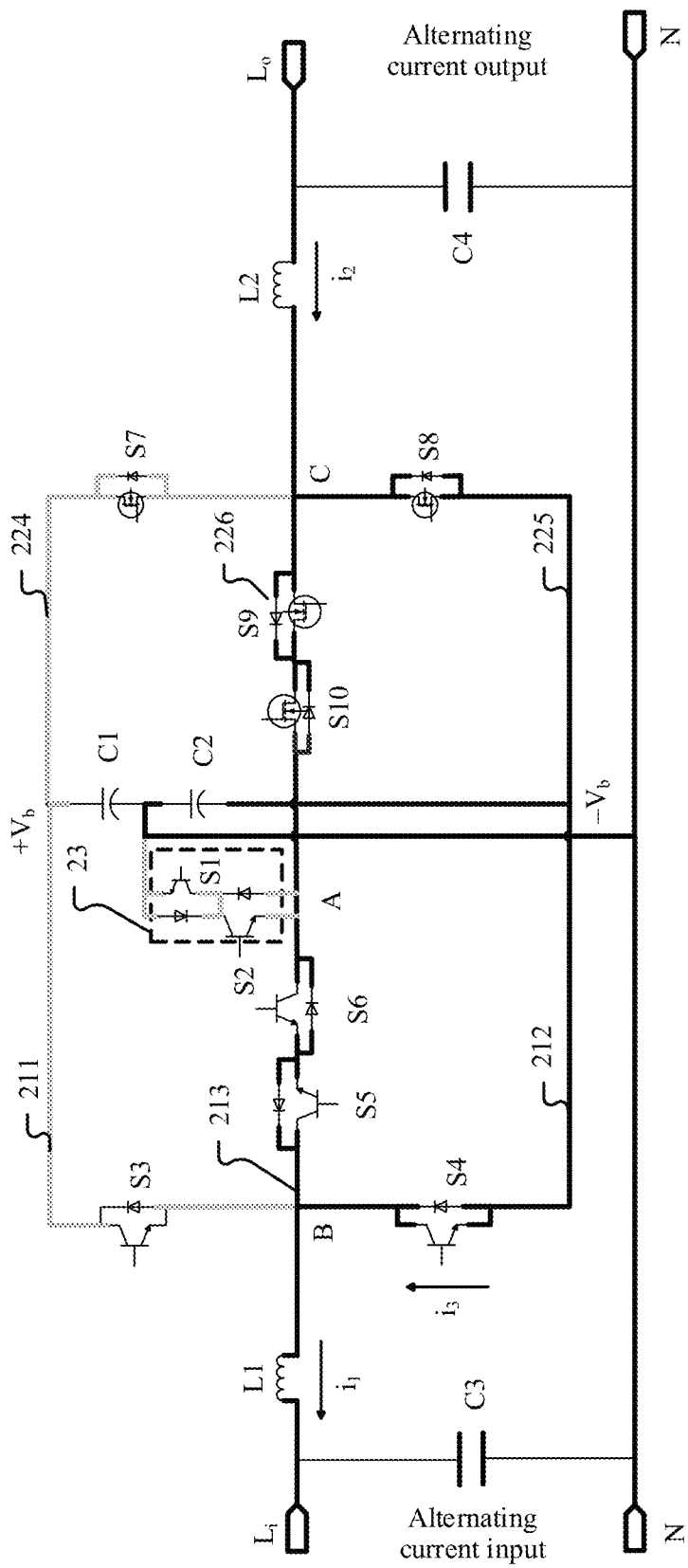
FIG. 13 is a schematic diagram of another control state of an alternating current power supply circuit shown in FIG. 2.

FIG. 13 is a schematic diagram of another control state of an alternating current power supply circuit shown in FIG. 2. The control state shown in FIG. 13 corresponds to a moment t2 in FIG. 9. As shown in FIG. 9, the switching transistor S8 is turned on at the moment t2. As described above with reference to FIG. 12, a voltage between the source and the drain of the switching transistor S8 is zero voltage at the moment t1. Therefore, when the switching transistor S8 is turned on at the moment t2, zero voltage switching of the switching transistor S8 is performed. Compared with a case in which the switching transistor S8 in FIG. 1 is turned on at a large voltage, energy consumption of the switching transistor S8 is greatly reduced, and efficiency of the alternating current power supply is improved. In addition, as shown in FIG. 13, after the switching transistor S8 is turned on, two branches are connected between a point B and a point C. One branch on a lower side includes the diode S4 and the switching transistor S8, and the other branch on an upper side includes the diode S9, the switching transistor S10, the switching transistor S6, and the diode S5. It is assumed that a resistance value of each switching component is R. Therefore, a total resistance value of the lower branch is 2R, a total resistance value of the upper branch is 4R, and it can be learned, based on a current calculation formula i=U/R, that a current of the lower branch is twice of a current of the upper branch. In other words, the current of the upper branch is smaller.

Therefore, as shown in FIG. 9, when the switching transistor S6 is turned off at a moment t3, the switching transistor S6 is turned off at zero voltage in a case of a low current, to further reduce energy consumption existing when the switching transistor S6 is turned off. At a moment t4, the switching transistor S2 is turned on, and the switching transistor S4 is turned on, to enter a next period of the control logic.

With reference to the foregoing description in FIG. 8, it can be similarly learned that, in the second condition, when the voltage and the current on the inverter side have different phases, by using the control logic shown in FIG. 9, zero voltage switching of the switching transistor S8 may still be performed, and the switching transistor S6 may still be turned off at zero voltage in a case of a small current.

With reference to the foregoing description in FIG. 3, it can be similarly learned that, in the control logic of the circuit 200 in the second condition, it is not specified that the switching transistor S2 is turned off at the moment t1 before the switching transistor S8 is turned on as shown in FIG. 9. Instead, the switching transistor S2 may be turned off at a moment before the moment t1, provided that a downward current flows in the switching transistor S2 at the turn-off moment. In addition, it is not specified that the switching transistor S2 is turned on at the moment t4 as shown in FIG. 9. The switching transistor S2 may be turned on when the switching transistor S9 is turned on, to turn on the branch 226.

Figure 14:
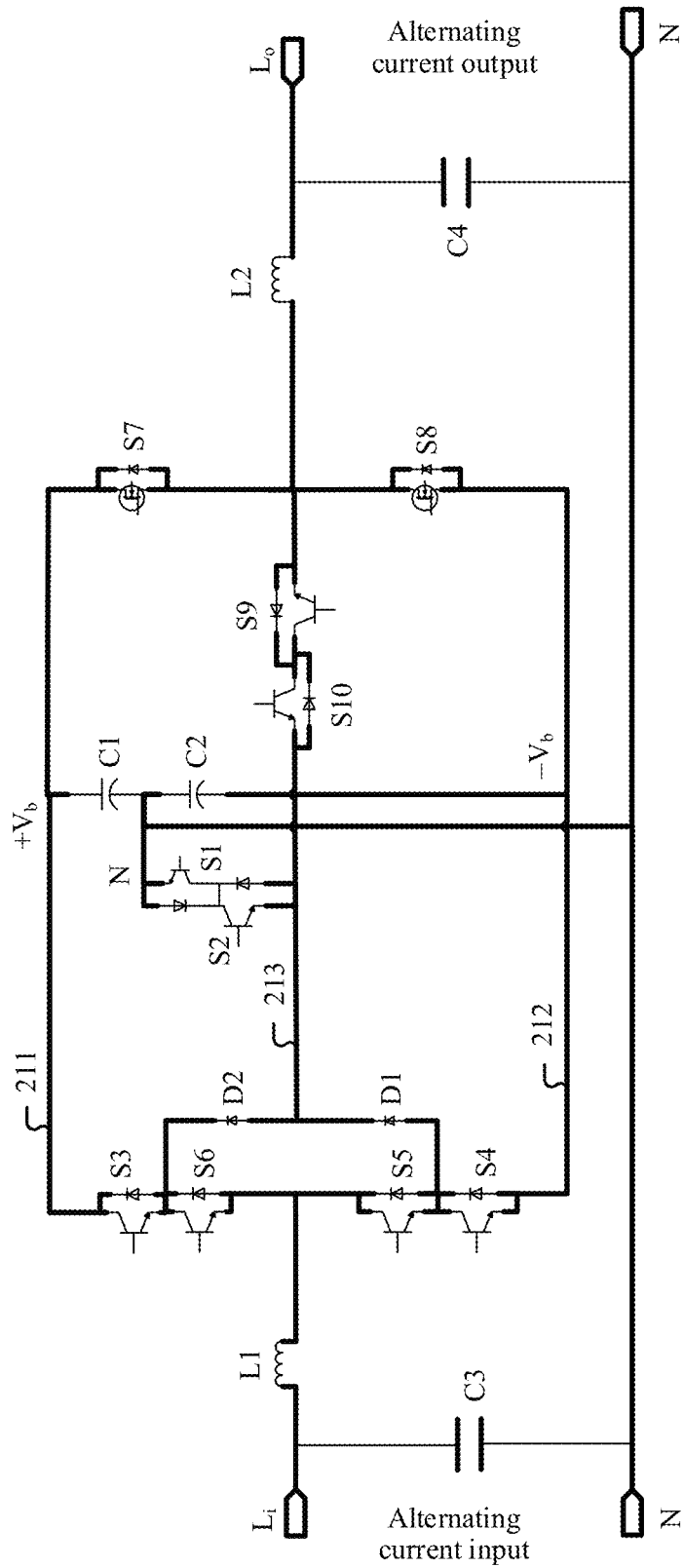
FIG. 14 is a diagram of an alternating current power supply circuit according to another embodiment of this application.

As described above, the alternating current power supply circuit 200 shown in FIG. 2 has a T-type three-level topology on the rectifier side and has a T-type three-level topology on the inverter side. An alternating current power supply circuit provided in this application is not limited to the alternating current power supply circuit shown in FIG. 2. FIG. 14 is a diagram of an alternating current power supply circuit according to another embodiment of this application. Different from the circuit shown in FIG. 2, the alternating current power supply circuit shown in FIG. 14 has an I-type three-level topology on a rectifier side, and includes a branch 211, a branch 212, and a branch 213. The branch 211 includes a switching component S3 and a switching component S6 that are connected in series in a same direction. Specifically, a collector of a switching transistor S3 is connected to a positive electrode of a capacitor C1, an emitter of the switching transistor S3 is connected to a collector of the switching transistor S6, and an emitter of the switching transistor S6 is connected to an inductor L1. The branch 212 includes a switching component S4 and a switching component S5 that are connected in series in a same direction. Specifically, an emitter of the switching transistor S4 is connected to a negative electrode of a capacitor C2, a collector of the switching transistor S4 is connected to an emitter of the switching transistor S5, and a collector of the switching transistor S5 is connected to the inductor L1. The branch 213 includes two sub-branches that are connected in parallel, and one sub-branch includes the switching component S6 and a diode D2 that are connected in series. Specifically, a collector of the switching transistor S6 is connected to a negative electrode of the diode D2, and a positive electrode of the diode D2 is connected to an emitter of the switching component S2. The other sub-branch of the branch 213 includes the switching component S5 and a diode D1 that are connected in series. Specifically, the emitter of the switching transistor S5 is connected to a positive electrode of the diode D1, and a negative electrode of the diode D1 is connected to the emitter of the switching component S2. Compared with the circuit on the rectifier side in FIG. 2, the circuit on the rectifier side in FIG. 14 additionally includes the diode D1 and the diode D2.

Figure 15:
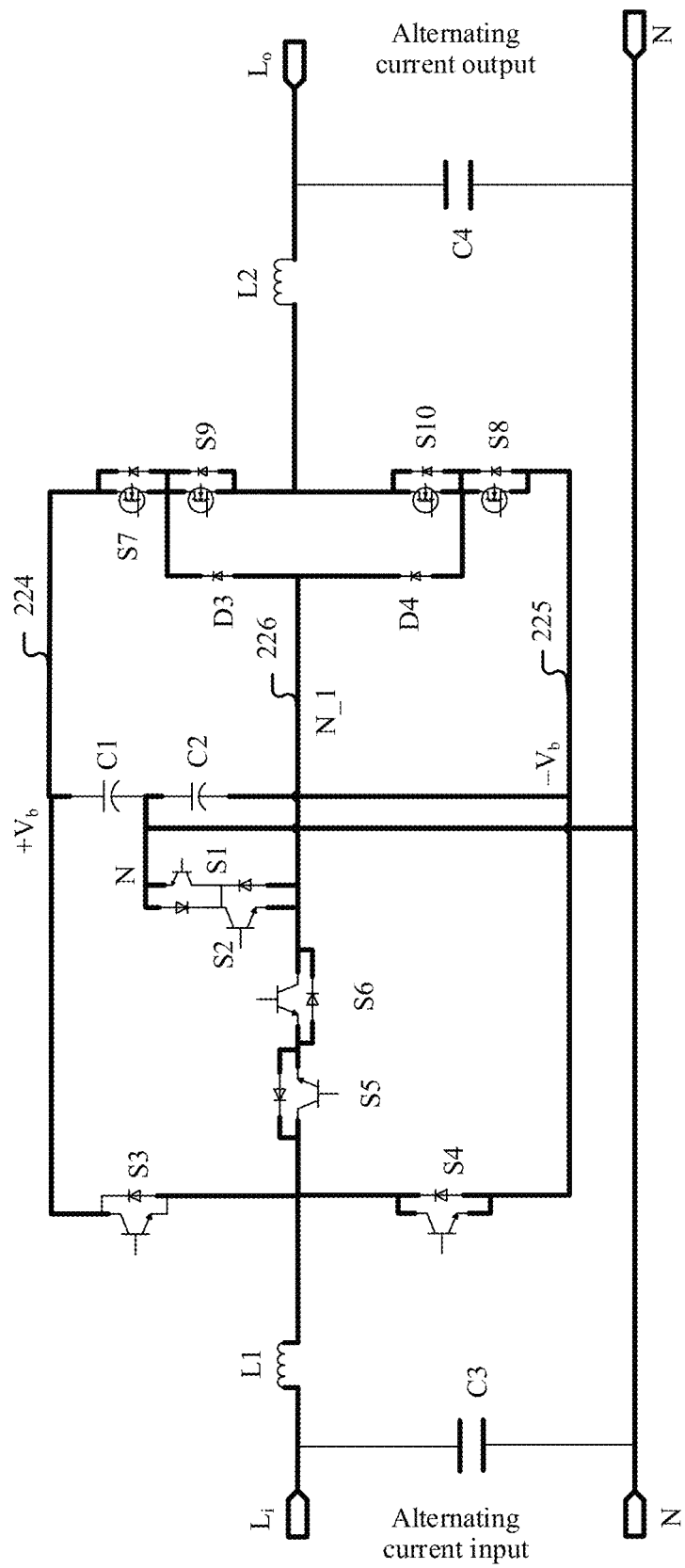
FIG. 15 is a diagram of an alternating current power supply circuit according to another embodiment of this application.

FIG. 15 is a diagram of an alternating current power supply circuit according to another embodiment of this application. Different from the circuit shown in FIG. 2, the alternating current power supply circuit shown in FIG. 15 has an I-type three-level topology on an inverter side, and includes a branch 224, a branch 225, and a branch 226. The branch 224 includes a switching component S7 and a switching component S9 that are connected in series in a same direction. Specifically, a drain of a switching transistor S7 is connected to a positive electrode of a capacitor C1, a source of the switching transistor S7 is connected to a drain of a switching transistor S9, and a source of the switching transistor S9 is connected to an inductor L2. The branch 225 includes a switching component S8 and a switching component S10 that are connected in series in a same direction. Specifically, a source of a switching transistor S8 is connected to a negative electrode of a capacitor C2, a drain of the switching transistor S8 is connected to a source of a switching transistor S10, and a drain of the switching transistor S10 is connected to the inductor L2. The branch 226 includes two sub-branches that are connected in parallel, and one sub-branch includes the switching component S9 and a diode D3 that are connected in series. Specifically, the drain of the switching transistor S9 is connected to a negative electrode of the diode D3, and a positive electrode of the diode D3 is connected to an emitter of a switching component S2. The other sub-branch of the branch 226 includes the switching component S10 and a diode D4 that are connected in series. Specifically, the source of the switching transistor S10 is connected to a positive electrode of the diode D4, and a negative electrode of the diode D4 is connected to the emitter of the switching component S2. Compared with the circuit on the inverter side in FIG. 2, the circuit on the inverter side in FIG. 15 additionally includes the diode D3 and the diode D4.

Figure 16:
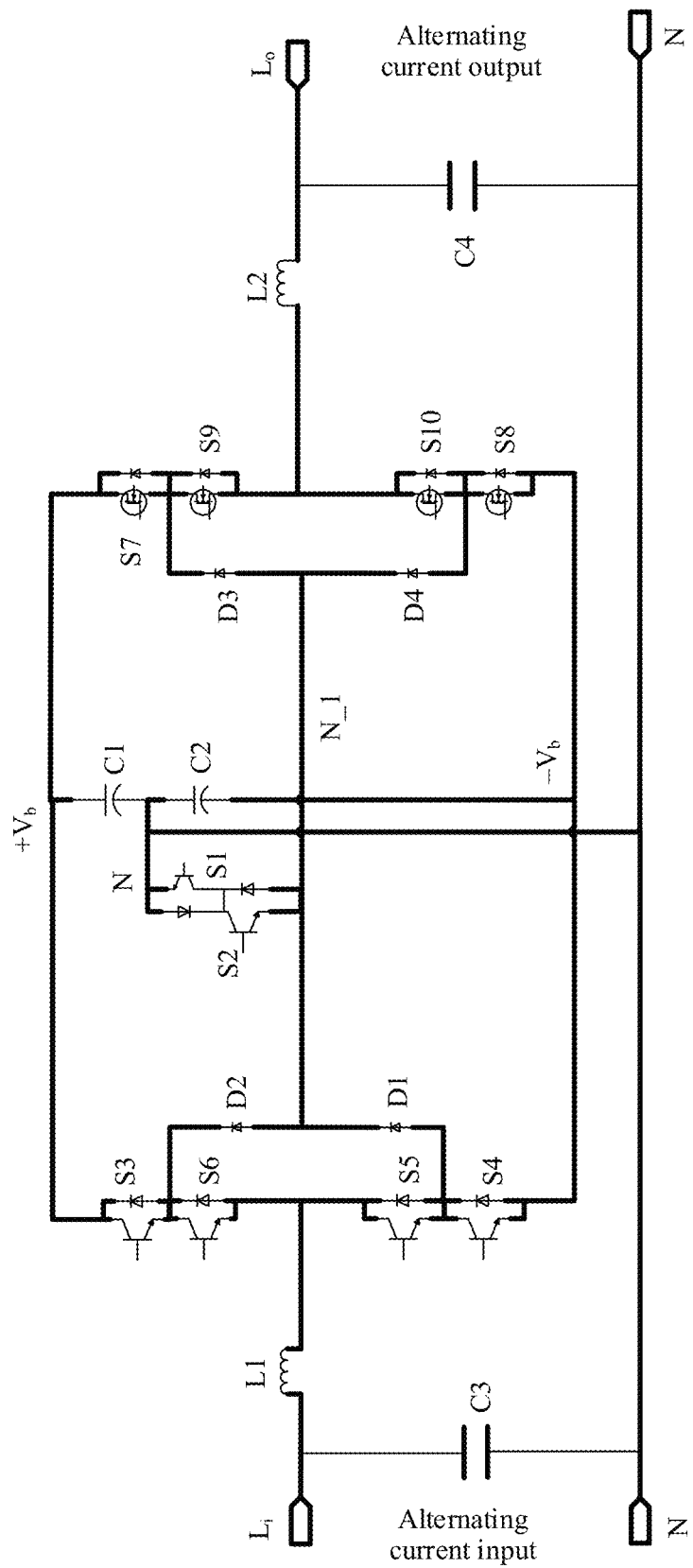
FIG. 16 is a diagram of an alternating current power supply circuit according to another embodiment of this application.

FIG. 16 is a diagram of an alternating current power supply circuit according to another embodiment of this application. Different from the circuit in FIG. 2, the alternating current power supply circuit shown in FIG. 16 has an I-type three-level topology on each of a rectifier side and an inverter side. For a specific structure of the I-type three-level topology on each of the rectifier side and the inverter side, refer to the I-type three-level topology on the rectifier side in FIG. 14 and the I-type three-level topology on the inverter side in FIG. 15. Details are not described herein again.

For any alternating current power supply circuit in FIG. 14 to FIG. 16, when the first condition is met, each switching transistor in the circuit may be controlled by using the control logic shown in FIG. 3. Therefore, zero voltage switching of the switching transistor S7 is performed, and the switching transistor S5 is turned off at zero voltage in a case of a small voltage. When the second condition is met, each switching transistor in the circuit can be controlled by using the control logic shown in FIG. 9. Therefore, zero voltage switching of the switching transistor S8 is performed, and the switching transistor S6 is turned off at zero voltage in a case of a small voltage, to reduce energy consumption of the switching component, and improve efficiency of the alternating current power supply circuit.

It should be understood that descriptions such as "first" and "second" in this specification are merely used to distinguish similar concepts for ease of simple description, but do not have another limiting function.

A person of ordinary skill in the art may be aware that, the units and algorithm steps in the examples described with reference to embodiments disclosed in this specification may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely preferred specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An alternating current power supply circuit, comprising:
a rectifier and an inverter, wherein:
the rectifier comprises a first inductor, a first branch, a second branch, a third branch, a first capacitor, and a second capacitor, a first end of the first inductor is connected to an input potential, a second end of the first inductor is connected to a common end of the first branch, the second branch, and the third branch, the other end of the first branch is connected to a first electrode of the first capacitor, the other end of the second branch is connected to a second electrode of the second capacitor, a second electrode of the first capacitor is connected to a first electrode of the second capacitor and is connected to a zero potential, the other end of the third branch is connected to a soft switching cell, the soft switching cell comprises a first switching component and a second switching component that are reversely connected in series, a first end of the soft switching cell is connected to a common end of the first capacitor and the second capacitor, a second end of the soft switching cell is configured to be connected to the third branch, and the first branch, the second branch, and the third branch form an I-type three-level topology or a T-type three-level topology;

the inverter comprises a second inductor, a fourth branch, a fifth branch, a sixth branch, the first capacitor, and the second capacitor, a first end of the second inductor is connected to an output potential, a second end of the second inductor is connected to a common end of the fourth branch, the fifth branch, and the sixth branch, the other end of the fourth branch is connected to the first electrode of the first capacitor, the other end of the fifth branch is connected to the second electrode of the second capacitor, the other end of the sixth branch comprises the soft switching cell, the soft switching cell is connected to the sixth branch by using the second end of the soft switching cell, and the fourth branch, the fifth branch, and the sixth branch form an I-type three-level topology or a T-type three-level topology; and the first branch comprises a third switching component and a sixth switching component that are connected in series in a same direction, the second branch comprises a fourth switching component and a fifth switching component that are connected in series in a same direction, the third branch further comprises a first sub-branch and a second sub-branch that are connected in parallel, the first sub-branch comprises the fifth switching component and a first diode that are connected in series in a same direction, the second sub-branch comprises the sixth switching component and a second diode that are connected in series in a same direction, and the first sub-branch and the second sub-branch that are connected in parallel are connected to the soft switching cell in series.

2. The circuit according to claim 1, wherein the fourth branch comprises a seventh switching component, the fifth branch comprises an eighth switching component, the sixth branch comprises a ninth switching component and a tenth switching component that are reversely connected in series, and the ninth switching component and the tenth switching component that are reversely connected in series are connected to the soft switching cell in series.

3. The circuit according to claim 1, wherein the fourth branch comprises a seventh switching component and a ninth switching component that are connected in series in a same direction, the fifth branch comprises an eighth switching component and a tenth switching component that are connected in series in a same direction, the third branch comprises a third sub-branch and a fourth sub-branch that are connected in parallel, the third sub-branch comprises the ninth switching component and a third diode that are connected in series in a same direction, the fourth sub-branch comprises the tenth switching component and a fourth diode that are connected in series in a same direction, and the third sub-branch and the fourth sub-branch that are connected in parallel are connected to the soft switching cell in series.

4. The circuit according to claim 2, wherein the rectifier further comprises a third capacitor, one end of the third capacitor is connected to the input potential, and the other end of the third capacitor is connected to the zero potential.

5. The circuit according to claim 3, wherein the rectifier further comprises a third capacitor, one end of the third capacitor is connected to the input potential, and the other end of the third capacitor is connected to the zero potential.

6. The circuit according to claim 4, wherein the inverter further comprises a fourth capacitor, one end of the fourth capacitor is connected to the output potential, and the other end of the fourth capacitor is connected to the zero potential.

7. The circuit according to claim 2, wherein when the input potential and the output potential each are a positive potential, the third switching component and the fifth switching component are controlled to alternately emit a wave, the fourth switching component is controlled to be constantly turned off, the sixth switching component is controlled to be constantly turned on, the seventh switching component and the tenth switching component are controlled to alternately emit a wave, the eighth switching component is controlled to be constantly turned off, the ninth switching component is controlled to be constantly turned on, the fifth switching component is controlled to be turned off after the seventh switching component is turned on, the second switching component is controlled to be constantly turned on, the first switching component is controlled to be turned off in a time period from a first moment to a second moment and to be turned on in another time period, the first moment is a predetermined moment before the seventh switching component is turned on, and the second moment is a predetermined moment after the seventh switching component is turned on.

8. The circuit according to claim 7, wherein the second moment is a predetermined moment after the fifth switching component is turned off.

9. The circuit according to claim 7, wherein when the input potential and the output potential each are a negative potential, the fourth switching component and the sixth switching component are controlled to alternately emit a wave, the third switching component is controlled to be constantly turned off, the fifth switching component is controlled to be constantly turned on, the eighth switching component and the ninth switching component are controlled to alternately emit a wave, the seventh switching component is controlled to be constantly turned off, the tenth switching component is controlled to be constantly turned on, the sixth switching component is controlled to be turned off after the eighth switching component is turned on, the first switching component is controlled to be constantly turned on, the second switching component is controlled to be turned off in a time period from a third moment to a fourth moment and to be turned on in another time period, the third moment is a predetermined moment before the eighth switching component is turned on, and the fourth moment is a predetermined moment after the eighth switching component is turned on.

10. The circuit according to claim 9, wherein the fourth moment is a predetermined moment after the sixth switching component is turned off.

11. A control method for an alternating current power supply circuit, wherein the alternating current power supply circuit comprises:
a rectifier and an inverter;
wherein the rectifier comprises a first inductor, a first branch, a second branch, a third branch, a first capacitor, and a second capacitor, a first end of the first inductor is connected to an input potential, a second end of the first inductor is connected to a common end of the first branch, the second branch, and the third branch, the other end of the first branch is connected to a first electrode of the first capacitor, the other end of the second branch is connected to a second electrode of the second capacitor, a second electrode of the first capacitor is connected to a first electrode of the second capacitor and is connected to a zero potential, the other end of the third branch is connected to a soft switching cell, the soft switching cell comprises a first switching component and a second switching component that are reversely connected in series, a first end of the soft switching cell is connected to a common end of the first capacitor and the second capacitor, a second end of the soft switching cell is configured to be connected to the third branch, and the first branch, the second branch, and the third branch form an I-type three-level topology or a T-type three-level topology; and
wherein the inverter comprises a second inductor, a fourth branch, a fifth branch, a sixth branch, the first capacitor, and the second capacitor, a first end of the second inductor is connected to an output potential, a second end of the second inductor is connected to a common end of the fourth branch, the fifth branch, and the sixth branch, the other end of the fourth branch is connected to the first electrode of the first capacitor, the other end of the fifth branch is connected to the second electrode of the second capacitor, the other end of the sixth branch comprises the soft switching cell, the soft switching cell is connected to the sixth branch by using the second end of the soft switching cell, and the fourth branch, the fifth branch, and the sixth branch form an I-type three-level topology or a T-type three-level topology;
wherein the first branch comprises a third switching component, the second branch comprises a fourth switching component, the third branch further comprises a fifth switching component and a sixth switching component that are reversely connected in series, and the fifth switching component and the sixth switching component that are reversely connected in series are connected to the soft switching cell in series;
wherein the fourth branch comprises a seventh switching component, the fifth branch comprises an eighth switching component, the sixth branch comprises a ninth switching component and a tenth switching component that are reversely connected in series, and the ninth switching component and the tenth switching component that are reversely connected in series are connected to the soft switching cell in series;
and wherein the method comprises:
monitoring an input potential and an output potential of the alternating current power supply circuit; and
based on the input potential and the output potential each being a positive potential, controlling the third switching component and the fifth switching component to alternately emit a wave, controlling the fourth switching component to be constantly turned off, controlling the sixth switching component to be constantly turned on, controlling the seventh switching component and the tenth switching component to alternately emit a wave, controlling the eighth switching component to be constantly turned off, controlling the ninth switching component to be constantly turned on, controlling the fifth switching component to be turned off after the seventh switching component is turned on, controlling the second switching component to be constantly turned on, and controlling the first switching component to be turned off in a time period from a first moment to a second moment and to be turned on in another time period, wherein the first moment is a predetermined moment before the seventh switching component is turned on, and the second moment is a predetermined moment after the seventh switching component is turned on.

12. The method according to claim 11, wherein the second moment is a predetermined moment after the fifth switching component is turned off.

13. The method according to claim 11, further comprising: based on the input potential and the output potential each being a negative potential, controlling the fourth switching component and the sixth switching component to alternately emit a wave, controlling the third switching component to be constantly turned off, controlling the fifth switching component to be constantly turned on, controlling the eighth switching component and the ninth switching component to alternately emit a wave, controlling the seventh switching component to be constantly turned off, controlling the tenth switching component to be constantly turned on, controlling the sixth switching component to be turned off after the eighth switching component is turned on, controlling the first switching component to be constantly turned on, and controlling the second switching component to be turned off in a time period from a third moment to a fourth moment and to be turned on in another time period, wherein the third moment is a predetermined moment before the eighth switching component is turned on, and the fourth moment is a predetermined moment after the eighth switching component is turned on.

14. The method according to claim 12, further comprising: based on the input potential and the output potential each being a negative potential, controlling the fourth switching component and the sixth switching component to alternately emit a wave, controlling the third switching component to be constantly turned off, controlling the fifth switching component to be constantly turned on, controlling the eighth switching component and the ninth switching component to alternately emit a wave, controlling the seventh switching component to be constantly turned off, controlling the tenth switching component to be constantly turned on, controlling the sixth switching component to be turned off after the eighth switching component is turned on, controlling the first switching component to be constantly turned on, and controlling the second switching component to be turned off in a time period from a third moment to a fourth moment and to be turned on in another time period, wherein the third moment is a predetermined moment before the eighth switching component is turned on, and the fourth moment is a predetermined moment after the eighth switching component is turned on.

15. The method according to claim 13, wherein the fourth moment is a predetermined moment after the sixth switching component is turned off.

16. An alternating current power supply, comprising a controller and an alternating current power supply circuit, wherein the alternating current power supply circuit comprises:
a rectifier and an inverter;
wherein the rectifier comprises a first inductor, a first branch, a second branch, a third branch, a first capacitor, and a second capacitor, a first end of the first inductor is connected to an input potential, a second end of the first inductor is connected to a common end of the first branch, the second branch, and the third branch, the other end of the first branch is connected to a first electrode of the first capacitor, the other end of the second branch is connected to a second electrode of the second capacitor, a second electrode of the first capacitor is connected to a first electrode of the second capacitor and is connected to a zero potential, the other end of the third branch is connected to a soft switching cell, the soft switching cell comprises a first switching component and a second switching component that are reversely connected in series, a first end of the soft switching cell is connected to a common end of the first capacitor and the second capacitor, a second end of the soft switching cell is configured to be connected to the third branch, and the first branch, the second branch, and the third branch form an I-type three-level topology or a T-type three-level topology; and wherein the inverter comprises a second inductor, a fourth branch, a fifth branch, a sixth branch, the first capacitor, and the second capacitor, a first end of the second inductor is connected to an output potential, a second end of the second inductor is connected to a common end of the fourth branch, the fifth branch, and the sixth branch, the other end of the fourth branch is connected to the first electrode of the first capacitor, the other end of the fifth branch is connected to the second electrode of the second capacitor, the other end of the sixth branch comprises the soft switching cell, the soft switching cell is connected to the sixth branch by using the second end of the soft switching cell, and the fourth branch, the fifth branch, and the sixth branch form an I-type three-level topology or a T-type three-level topology;

wherein the first branch comprises a third switching component, the second branch comprises a fourth switching component, the third branch further comprises a fifth switching component and a sixth switching component that are reversely connected in series, and the fifth switching component and the sixth switching component that are reversely connected in series are connected to the soft switching cell in series;

wherein the fourth branch comprises a seventh switching component, the fifth branch comprises an eighth switching component, the sixth branch comprises a ninth switching component and a tenth switching component that are reversely connected in series, and the ninth switching component and the tenth switching component that are reversely connected in series are connected to the soft switching cell in series;

wherein the controller is connected to the alternating current power supply circuit, to perform a method which comprises:

monitoring the input potential and the output potential of the alternating current power supply circuit; and based on the input potential and the output potential each being a positive potential, controlling the third switching component and the fifth switching component to alternately emit a wave, controlling the fourth switching component to be constantly turned off, controlling the sixth switching component to be constantly turned on, controlling the seventh switching component and the tenth switching component to alternately emit a wave, controlling the eighth switching component to be constantly turned off, controlling the ninth switching component to be constantly turned on, controlling the fifth switching component to be turned off after the seventh switching component is turned on, controlling the second switching component to be constantly turned on, and controlling the first switching component to be turned off in a time period from a first moment to a second moment and to be turned on in another time period, wherein the first moment is a predetermined moment before the seventh switching component is turned on, and the second moment is a predetermined moment after the seventh switching component is turned on.

* * * * *